United States Patent
Gerber et al.

(10) Patent No.: US 11,964,641 B2
(45) Date of Patent: Apr. 23, 2024

(54) ELECTRONIC PARKING BRAKE

(71) Applicant: ZF Active Safety US Inc., Livonia, MI (US)

(72) Inventors: Kraig Gerber, Plymouth Township, MI (US); Galus Chelaidite, South Lyon, MI (US)

(73) Assignee: ZF Active Safety US Inc., Livonia, MI (US)

( * ) Notice: Subject to any disclaimer, the term of this patent is extended or adjusted under 35 U.S.C. 154(b) by 331 days.

(21) Appl. No.: 17/374,423

(22) Filed: Jul. 13, 2021

(65) Prior Publication Data

US 2023/0016924 A1    Jan. 19, 2023

(51) Int. Cl.
| | | |
|---|---|---|
| *F16D 55/18* | (2006.01) | |
| *B60T 1/06* | (2006.01) | |
| *B60T 13/58* | (2006.01) | |
| *F16D 65/18* | (2006.01) | |
| *F16D 65/56* | (2006.01) | |

(52) U.S. Cl.
CPC ............. *B60T 13/58* (2013.01); *B60T 1/065* (2013.01); *F16D 65/183* (2013.01); *F16D 65/567* (2013.01)

(58) Field of Classification Search
CPC .... B60T 1/065; F16D 65/183; F16D 2127/06; F16D 2129/08
See application file for complete search history.

(56) References Cited

U.S. PATENT DOCUMENTS

| | | | | |
|---|---|---|---|---|
| 6,311,808 B1 * | 11/2001 | Halasy-Wimmer | .......................... | B60T 11/105 188/68 |
| 6,971,485 B1 * | 12/2005 | Sherman, II | ............ | F16D 65/18 188/162 |
| 7,134,533 B2 * | 11/2006 | Hashida | .................. | F16D 65/18 188/72.4 |
| 8,020,675 B2 * | 9/2011 | Cao | ....................... | B60T 13/741 188/162 |

(Continued)

FOREIGN PATENT DOCUMENTS

| | | |
|---|---|---|
| DE | 102015211684 A1 | 5/2016 |
| DE | 102020118809 A1 | 1/2021 |
| DE | 102020208077 A1 | 1/2021 |

OTHER PUBLICATIONS

German Search Report dated 2023-07-2021. English translation not provided.

*Primary Examiner* — Nicholas J Lane
(74) *Attorney, Agent, or Firm* — Kristin L. Murphy

(57) ABSTRACT

A parking brake for a wheel rotor having a brake pad associated therewith includes a housing defining first and second passages. First and second pistons are provided in the respective first and second passages. Spindles are threadably connected with each piston. A clutch unit is connected to the spindles. The clutch unit has a first condition allowing relative rotation between the spindles and the pistons such that the pistons are axially movable within the passages and into engagement with the brake pad in response to hydraulic pressure applied to the pistons. The clutch unit has a second condition preventing relative rotation between the spindles and the pistons such that pistons remains engaged with the brake pad when hydraulic fluid pressure is removed from the pistons.

11 Claims, 25 Drawing Sheets

(56) References Cited

U.S. PATENT DOCUMENTS

| | | | |
|---|---|---|---|
| 2005/0252732 A1* | 11/2005 | Hashida | B60T 13/74 188/71.9 |
| 2020/0096067 A1* | 3/2020 | Boyle | F16D 65/0971 |
| 2021/0001826 A1* | 1/2021 | Gerber | F16D 7/044 |
| 2022/0388490 A1* | 12/2022 | Suzuki | F16D 55/226 |
| 2023/0012601 A1* | 1/2023 | Gerber | F16D 65/18 |
| 2023/0018281 A1* | 1/2023 | Gerber | B60Q 9/00 |

* cited by examiner

ELECTRONIC PARKING BRAKE

TECHNICAL FIELD

The present invention relates to braking systems and, in particular, relates to an electronic parking brake that maintains braking force without electrical power or hydraulic assistance.

BACKGROUND

Current vehicles are equipped with hydraulic service brakes and electric parking brakes (EPB) for helping control vehicle braking depending on predetermined scenarios. The service brakes rely on one or more movable pistons that selectively apply force to brake pads in order to slow down or stop rotating wheel rotors on the vehicle. The EPB can be used to, for example, supplement the service braking and/or maintain the vehicle at a standstill on a hill.

SUMMARY

In one example, a parking brake for a wheel rotor having a brake pad associated therewith includes a housing defining first and second passages. First and second pistons are provided in the respective first and second passages. Spindles are threadably connected with each piston. A clutch unit is connected to the spindles. The clutch unit has a first condition allowing relative rotation between the spindles and the pistons such that the pistons are axially movable within the passages and into engagement with the brake pad in response to hydraulic pressure applied to the pistons. The clutch unit has a second condition preventing relative rotation between the spindles and the pistons such that pistons remains engaged with the brake pad when hydraulic fluid pressure is removed from the pistons.

In another example, a parking brake for a wheel rotor having a brake pad associated therewith includes a housing defining first and second passages. First and second pistons are provided in the respective first and second passages. Spindles are threadably connected with each piston with a fast lead connection. A clutch unit is connected to the spindles and includes, for each spindle, a hub rotatably connected to the spindle and roller bearings arranged around the hub. The roller bearings are spaced from the hubs when the clutch unit is in a first condition to allow for relative rotation between the spindles and the pistons such that the pistons are movable within the passages and into engagement with the brake pad in response to hydraulic pressure applied to the pistons. The roller bearings are urged against the hubs to prevent rotation of the spindles when the clutch unit is in the second condition to thereby prevent relative rotation between the spindles and the pistons such that the pistons remain engaged with the brake pad when hydraulic fluid pressure is removed from the pistons.

In another example, a parking brake for a wheel rotor having a brake pad associated therewith includes a housing defining a passage. A piston is provided in the passage. A spindle is threadably connected with the piston. A clutch unit is connected to the spindle. The clutch unit has a first condition allowing relative rotation between the spindle and the piston such that the piston is axially movable within the passage and into engagement with the brake pad in response to hydraulic pressure applied to the piston. The clutch unit has a second condition preventing relative rotation between the spindle and the piston such that piston remains engaged with the brake pad when hydraulic fluid pressure is removed from the piston.

Other objects and advantages and a fuller understanding of the invention will be had from the following detailed description and the accompanying drawings.

DETAILED DESCRIPTION

Figure 1:
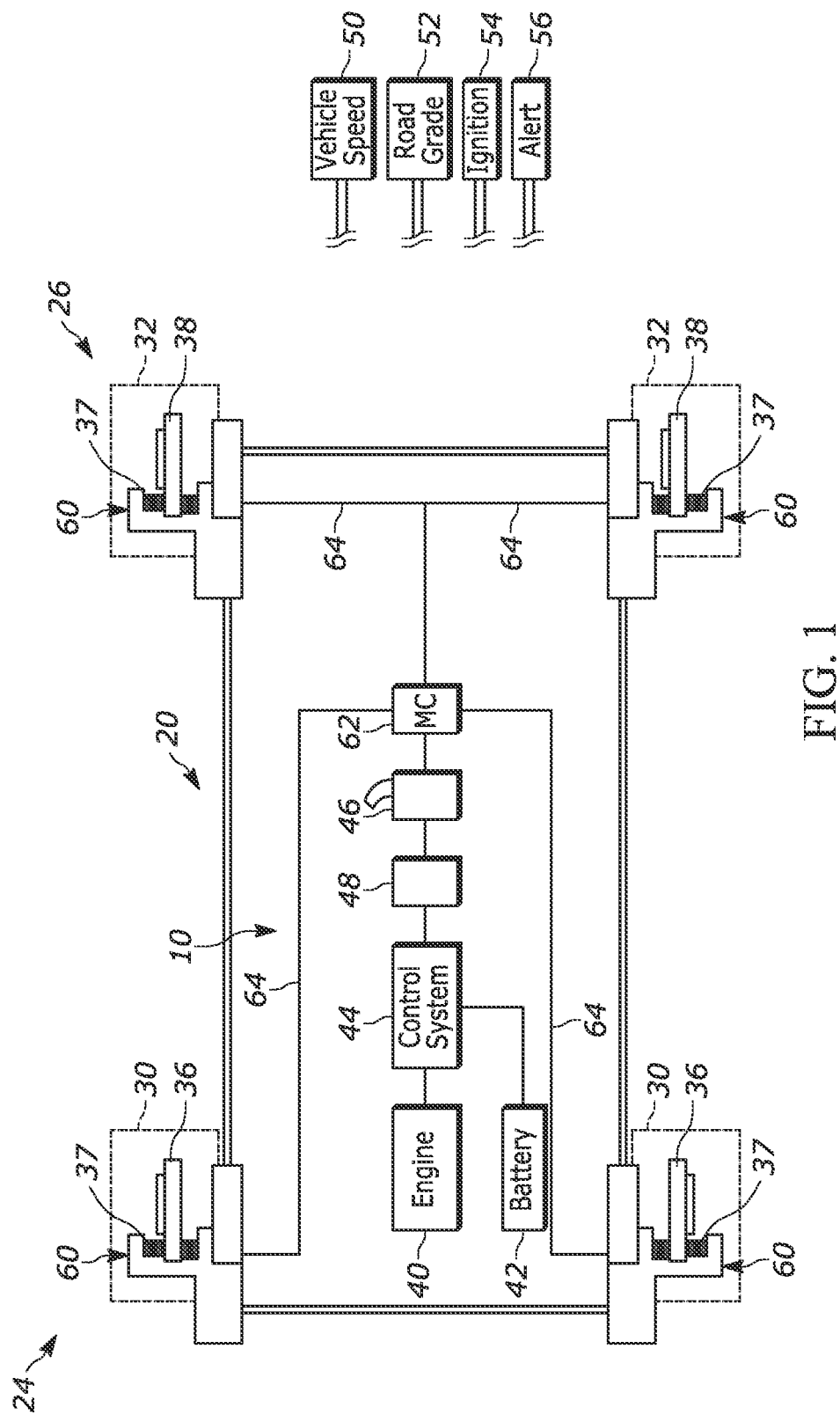
FIG. 1 is a schematic illustration of a vehicle having a braking system including an example caliper assembly.
Figure 2:
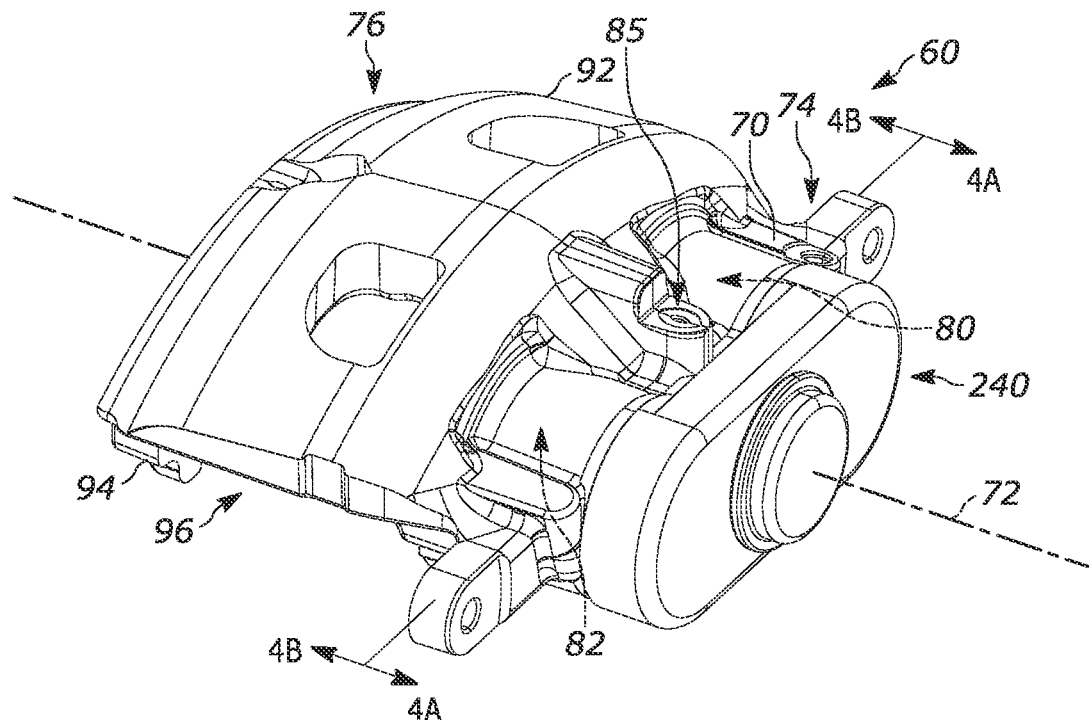
FIG. 2 is a side view of a housing of the caliper assembly.
Figure 3:
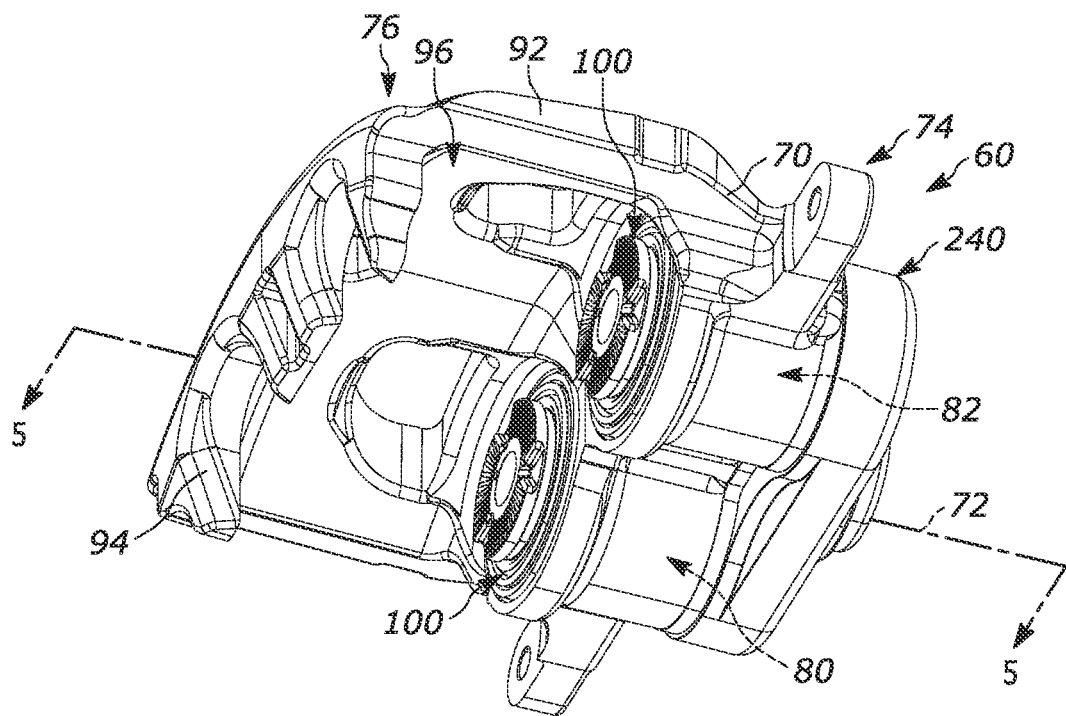
FIG. 3 is a bottom view of the housing.
Figure 4A:
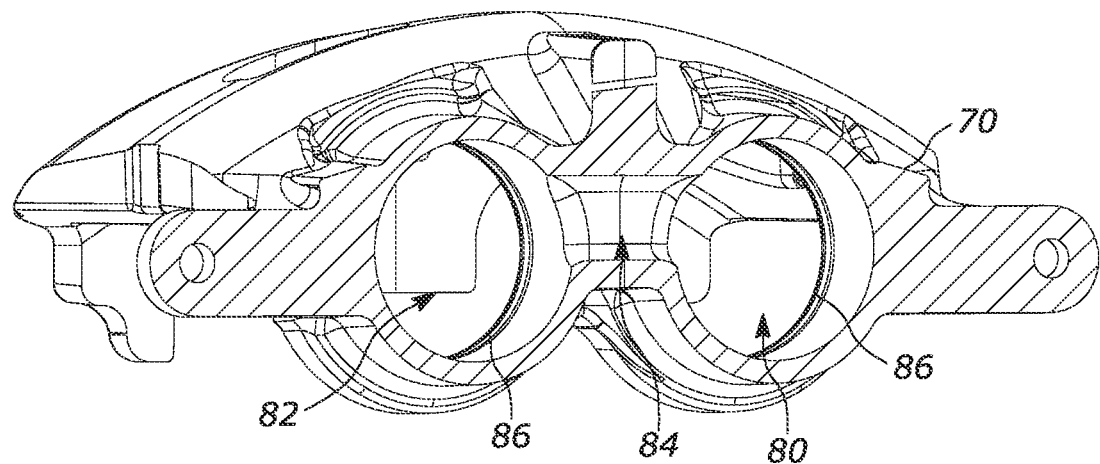
FIG. 4A is a section view taken along line 4A-4A of FIG. 2.
Figure 4B:
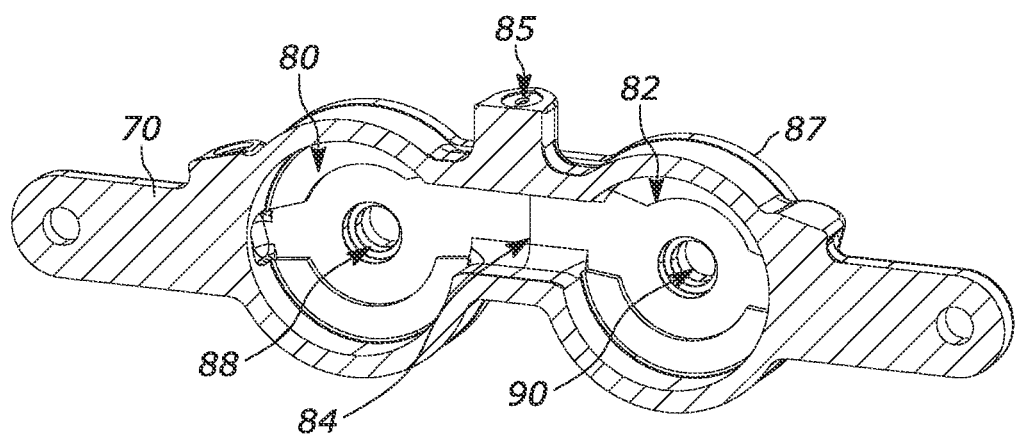
FIG. 4B is a section view taken along line 4B-4B of FIG. 2.

The present invention relates to braking systems and, in particular, relates to an electric parking brake that maintains braking force without electrical power or hydraulic assistance. FIG. 1 illustrates an example braking system 10 for a motor vehicle 20 in accordance with the present invention. The vehicle 20 can be an electric or hybrid vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

A propulsion system 40 including an engine and/or electric motor supplies torque to the wheels rotors 36 and/or the wheels rotors 38. A battery 42 supplies power to the vehicle 20. A brake pedal simulator 46 or brake pedal (not shown) is provided for controlling the timing and degree of vehicle 20 braking. A sensor 48 is connected to the brake pedal simulator 46 and monitors the displacement and acceleration of the brake pedal simulator.

A caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. It will be appreciated, however, that only the front wheel rotors 36 or only the rear wheel rotors 38 can include a caliper assembly 60 (not shown). The caliper assemblies 60 are connected to a master cylinder 62 by hydraulic lines 64. It will be appreciated that the fluid system for the caliper assemblies 60 and master cylinder 62 has been greatly simplified for brevity.

A control system 44 is provided for helping control operation of the vehicle 20, such as operation of the propulsion system 40 and vehicle braking, including operating the caliper assemblies 60. To this end, the control system 44 can include one or more controllers, such as a transmission controller, propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of when the ignition is turned on. The control system 44 can receive and interpret these signals and perform vehicle functions, e.g., braking, in response thereto. The control system 44 can also be connected to an alert 56 for notifying the driver/operator of the vehicle 20 of vehicle conditions, vehicle status, and/or environmental conditions.

Referring to FIGS. 2, 3, 4A and 4B, the caliper assembly 60 includes a housing 70 and a clutch unit 240 connected to the housing. The housing 70 extends generally along a centerline 72 from a first end 74 to a second end 76. First and second bores or passages 80, 82 (see FIGS. 4A-4B) extend into the housing 70 and parallel to the centerline 72. A passage 84 fluidly connects the first and second passages 80, 82. An inlet opening 85 extends into the housing 70 to the connecting passage 84. The inlet opening 85 is configured to receive hydraulic fluid from the hydraulic lines 64. An annular recess or seal groove 86 is provided in each passage 80, 82. A cover or end cap 87 on the first end 74 extends over and obstructs the passages 80, 82. The end cap 87 can be integrally formed with or a separate component connected to the first end 74. Openings 88, 90 extend through the end cap 87 and to the respective passages 80, 82.

A bridge 92 extends from the second end 74 of the housing 70 and along/parallel to the centerline 72. A projection 94 extends from the bridge 92 and transverse to the centerline 72. The bridge 92 and projection 94 cooperate to define a channel 96 for receiving the rotor 36 or 38 of one of the wheels 30 or 32.

Referring to FIGS. 5-8, a piston assembly 100 is provided in each passage 80, 82 in the housing 70. The piston assembly 100 includes a piston 102 extending along a centerline 104 from a first end 106 to a second end 108 (see FIG. 8). A first cavity 110 extends from the first end 104 towards the second end 108 and terminates at an axial end surface 112. The end surface 112 can be angled (as shown) or flat (not shown) relative to the centerline 104.

A second passage extends 114 from the end surface 110 towards the second end 108 and terminates at an axial end surface 116. A first annular recess 120 is provided in the first cavity 110 and encircles the centerline 104. A second annular recess 122 is provided on the exterior of the piston 102 at the second end 108 thereof. The piston 102 is formed from a material that is durable in both compression and tension, such as steel, aluminum or the like.

A nut 130 (FIG. 7) is provided in the first cavity 110 of the piston 102. The nut 130 includes a base 132 and a flange 134 extending radially outward from the base 132. The flange 134 includes a first axial end surface 136 and a second axial end surface 138. The second axial surface 138 abuts the axial end surface 112 of the piston 102 and has the same shape/contour thereof. A central passage 140 extends the entire length of the nut 130 through the base 132 and the flange 134. Threads 142 are provided along a portion of the central passage 140.

A volume reducer 150 is also provided in the first cavity 110 of the piston 102. The reducer 150 includes first and second axial end surfaces 152, 154. An inner surface 156 defines a central passage 158 (see FIG. 6) extending the entire length of the reducer 150 from the axial end surface 152 to the axial end surface 154. The reducer 150 also includes an outer surface 160. The reducer 150 can be formed from an incompressible material, such as aluminum or phenolic.

The base 132 of the nut 130 is received by the central passage 158 of the reducer 150 such that the axial end surface 154 of the reducer abuts the axial end surface 136 on the flange 134 of the nut 130. The inner surface 156 is adjacent to or abutting the base 130. The outer surface 158 is adjacent to or abutting the piston 102. The reducer 150 is securely fixed to the nut 130 along the surfaces 154, 156. In any case, the outer surface of the reducer 150 is positioned adjacent to or in engagement with the inner surface of the piston 102.

It will be appreciated that although the piston 102, nut 130 and reducer 150 are shown and described as separate components, the piston, nut, and reducer could likewise be formed integrally with one another. In any case, the nut 130 and reducer 150 are securely fixed or connected to the piston 102. That said, the nut 130 and reducer 150 (whether integrally formed with the piston 102 or securely fastened thereto) can be considered part of the piston.

A clip 170 forms a snap-fit with the annular recess 120 of the piston 102. The clip 170 abuts the base 132 of the nut 130 and the axial end surface 152 of the reducer 150 and maintains the nut and reducer within the first cavity 110 of the piston 102. The clip 170 also prevents relative movement between the piston 102, the nut 130, and the reducer 150.

A seal 172 extends around the exterior of the second end 108 of the piston 102. A piston boot excluder 180 is provided in the outer recess 122 and cooperates with the housing 70 to help prevent dirt and debris from entering the passages 80, 82.

Figure 7:
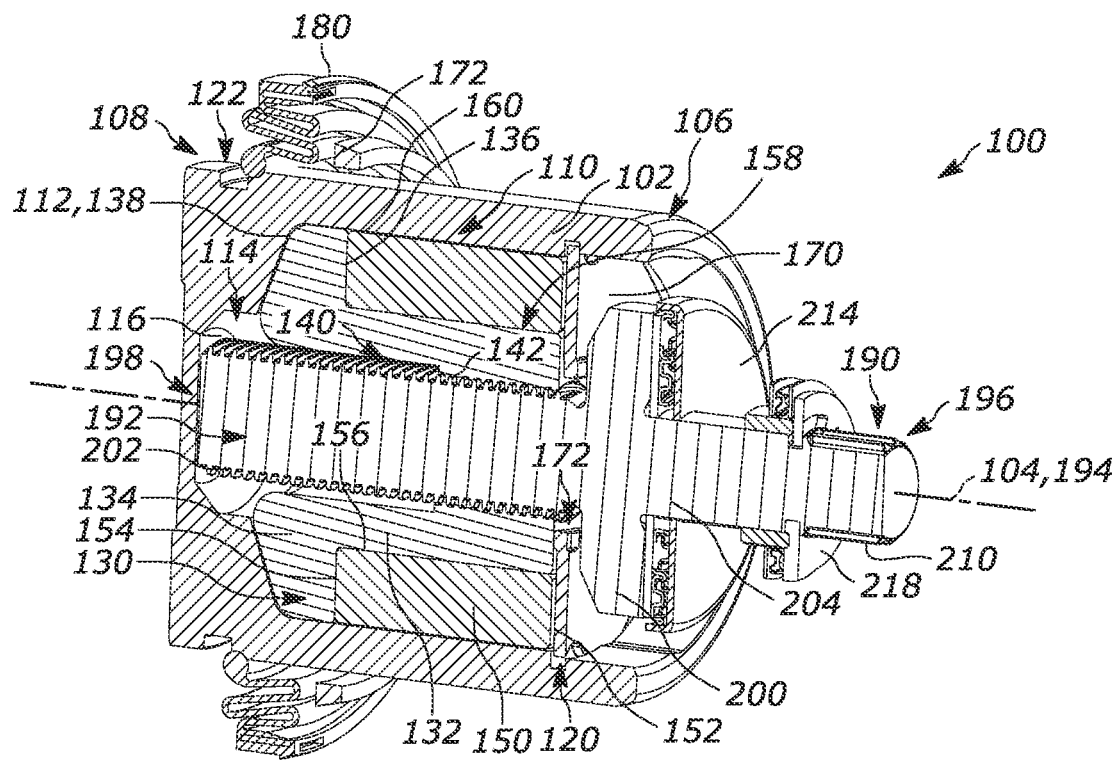
FIG. 7 is a section view of a piston assembly.
Figure 8:
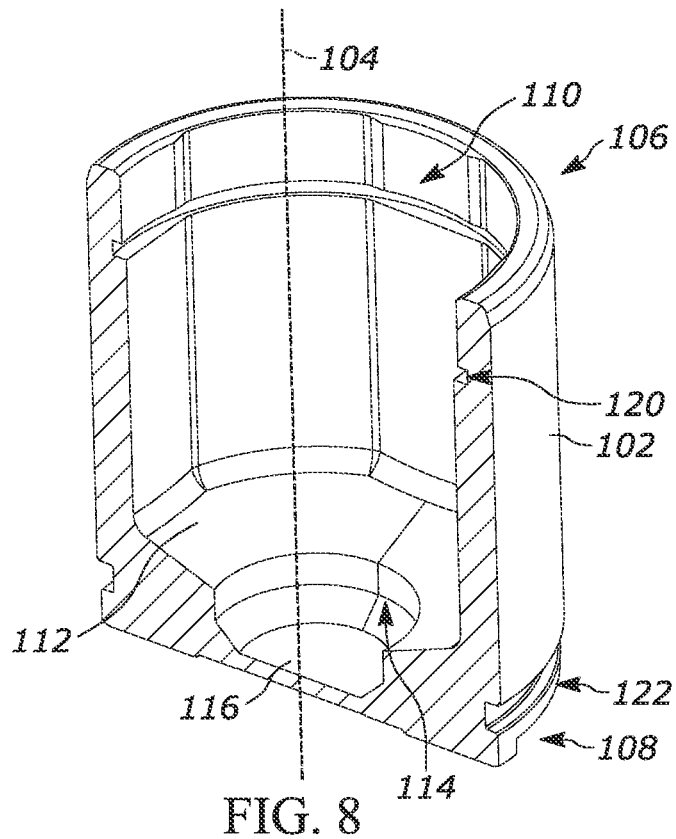
FIG. 8 is a section view of a piston of the piston assembly.
Figure 9:
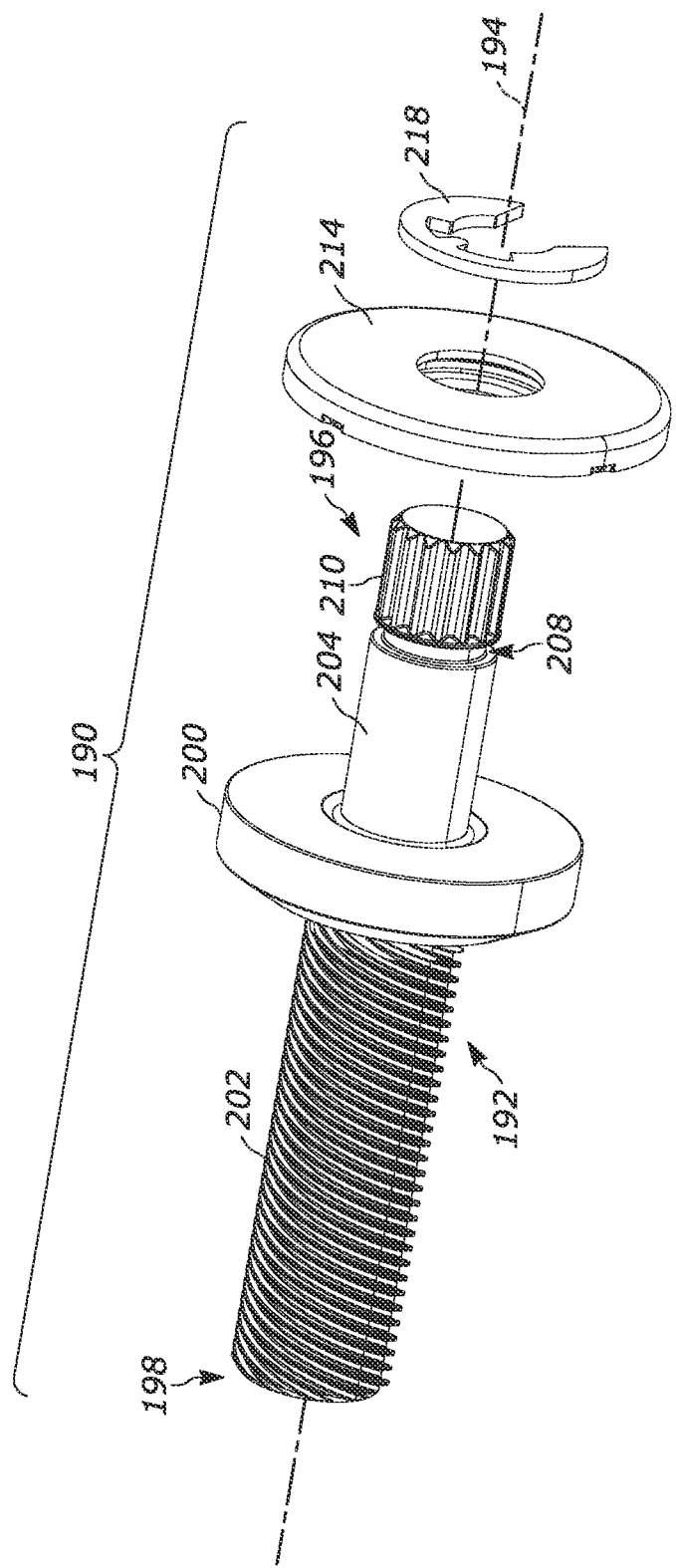
FIG. 9 is an exploded view of a spindle assembly.

As shown in FIGS. 7 and 9, a spindle assembly 190 extends through each piston assembly 100. The spindle assembly 190 includes a spindle 192 extending along an axis 194 from a first end 196 to a second end 198. A projection or flange 200 extends radially from the spindle 192 between the first and second ends 196, 198. External threads 202 are provided from the flange 200 to the extent of the second end 198. An unthreaded portion 204 extends from the projection 200 towards the first end 196 and terminates at an annular recess 208. A splined portion 210 extends from the annular recess 208 to the extent of the first end 196. A thrust bearing 214 is received by the unthreaded portion 204 and abuts the flange 200. A retaining ring 218 is configured to snap into the recess 208 on the first end 196 of the spindle 192.

The spindle assemblies 190 are connected to each respective piston assembly 100 as shown in FIG. 7. More specifically, the spindle 192 extends through the clip 170 and the passage 140 in the nut 130. The second end 198 of the spindle 192 abuts the axial end surface 116 of the piston 102. The threads 202 on the spindle 192 are threadably engaged with the threads 142 on the nut 130. As noted, the nut 130 can be integrally formed with or securely fastened to the piston 102. Consequently, the mating threads 142, 202 established a threaded connection between each spindle 190 and corresponding piston 102.

In any case, it will be appreciated that the mating threads 142, 202 can be configured to be "fast lead" threads. That is to say, the threads 142, 202 can be configured to have mating fast-pitch constructions that facilitate relative rotational and translational movement between the nut 130 and the spindle 192, which facilitates relative movement between the piston 102 and the spindle.

A piston assembly 100 and respective spindle 190 are provided in each of the passages 80, 82 in the housing 70. In particular, and referring back to FIG. 5, the first ends 106 of the pistons 102 are positioned closer to the first side 74 of the housing 70 while the second ends 106 are positioned closer to the second side 76. The seals 172 are positioned in the seal grooves 86 in the first and second passages 80, 82 and is configured to cooperate with the seal grooves (FIG. 5) to seal the piston 102 within the respective passage.

The unthreaded portion 204 of one spindle 192 extends through the passage 80 and the associated opening 88 to the exterior of the housing 70. The unthreaded portion 204 of another spindle 192 extends through the passage 82 and the associated opening 90 to the exterior of the housing 70. The thrust bearing 214 is provided on the unthreaded portion 204 and prevents axial movement of the spindle 190. The retaining rings 218 are positioned in the annular recesses 208 and outside the end cap 87 of the housing 70 to prevent the spindle 192 from moving axially towards the second end 76 of the housing 70.

Figure 10:
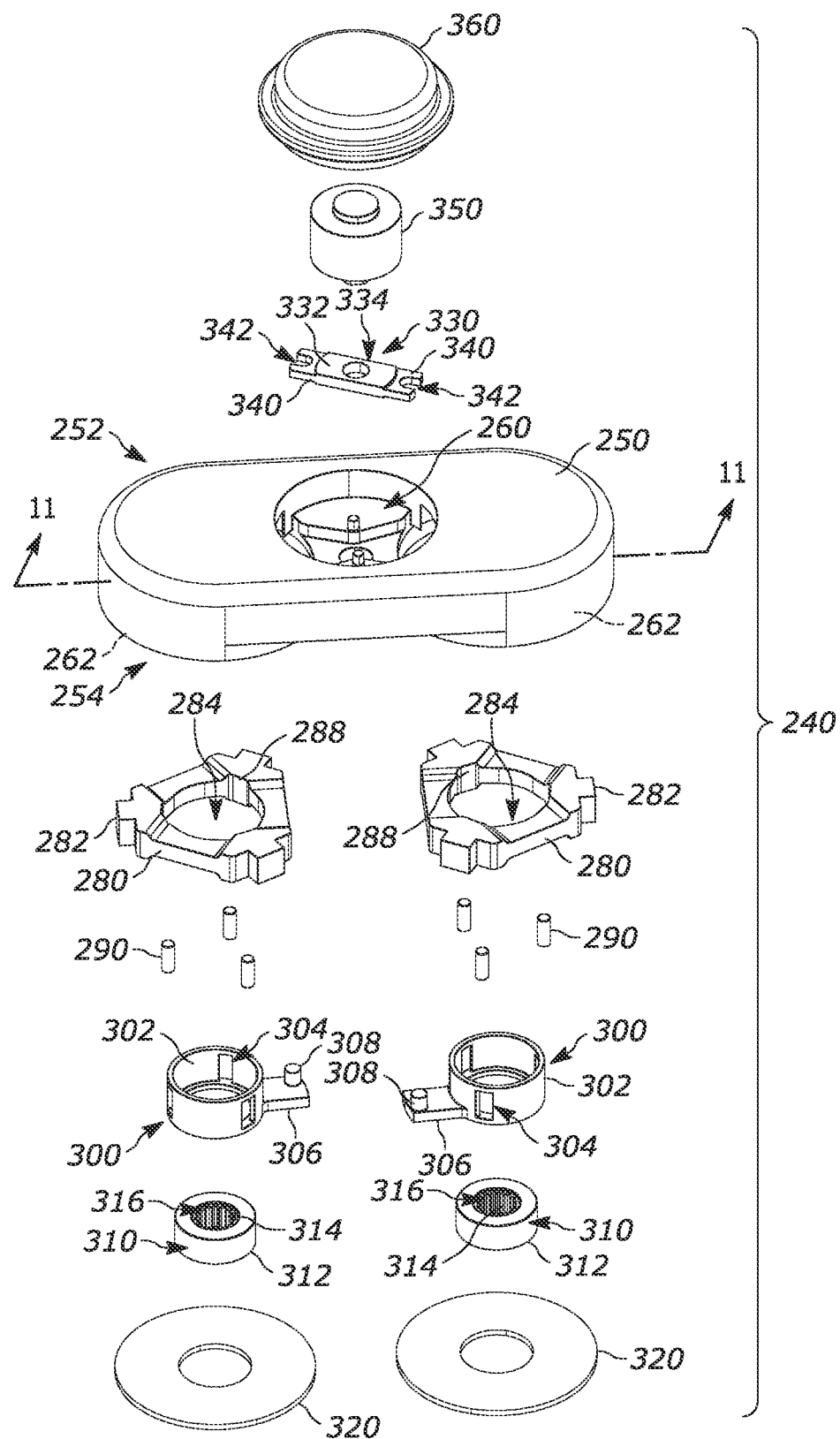
FIG. 10 is an exploded view of a clutch unit of the caliper assembly.

The clutch unit 240 is connected to the first end 74 of the housing 70 and the exposed ends 196 of the spindles 192. Referring to FIG. 10, the clutch unit 240 includes a housing 250 having a first side 252 and a second side 254. As will be described, an actuating arm 330, solenoid 350, and cap 360 are received in the first side 252. A wedge ring 280, roller bearings 290, roller cage 300, hub 310, and cap 320 (collectively a "clutch subassembly") are received in the second side 254 of the housing 250. The number of clutch subassemblies corresponds with the number of piston assemblies 100 provided in the housing 70. That said, although a pair of clutch assemblies are shown in FIG. 10, it will be appreciated that more or fewer clutch subassemblies can be provided in the clutch unit 240.

Figure 11:
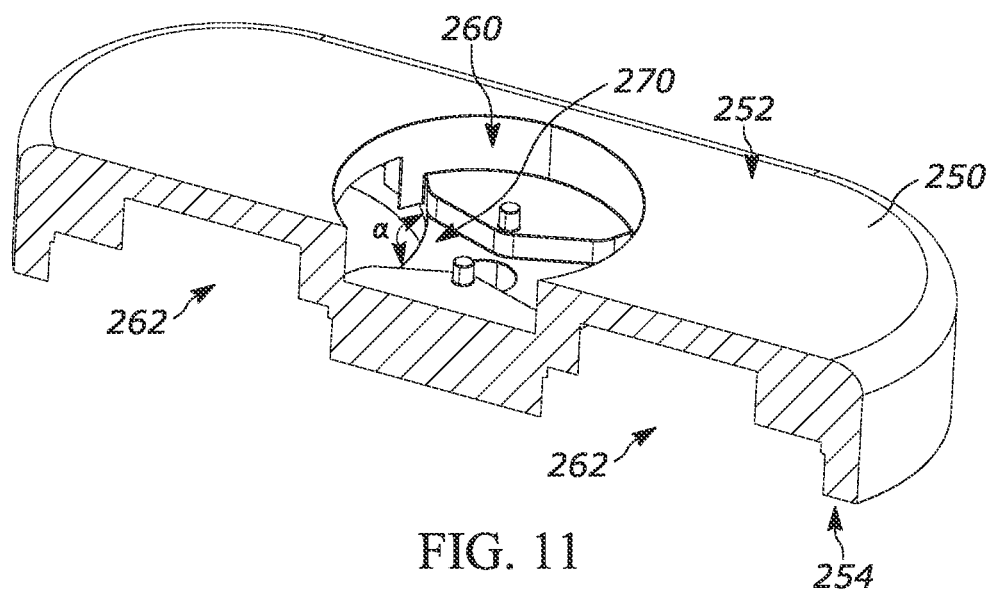
FIG. 11 is a section view taken along line 11-11 of FIG. 10.
Figure 12:
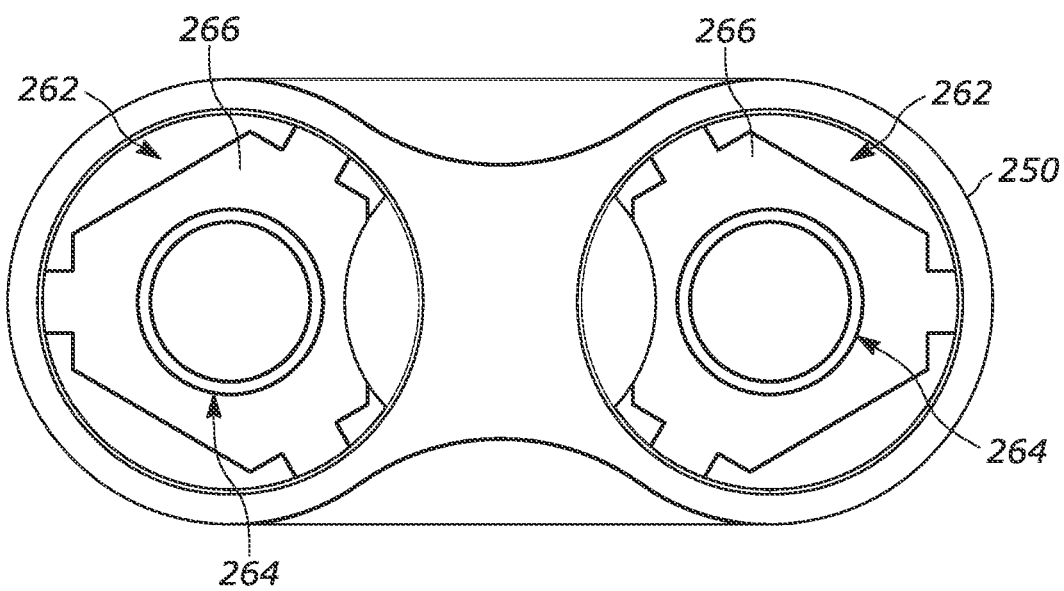
FIG. 12 is a bottom view of a housing of the caliper assembly.

Referring to FIGS. 11-12, a first passage 260 extends from the first side 252 of the housing 250 towards the second side 254. A pair of second passages 262 extends from the second side 254 towards the first side 252 and intersect the first passage 260. A circular recess 264 is provided in each second passage 260 and is centered therewith. A pocket 266 extends around each recess 264 and is sized/shaped to receive one of the wedge rings 280.

Referring back to FIG. 10, the wedge ring 280 has a polygonal, e.g., triangular shape. Projections 282 extend outward from the wedge ring 280. An inner surface defines an opening 284 that extends through the center of the wedge ring 280. The inner surface includes angled or ramped portions 288. In particular, the surfaces 288 are angled relative to the center of the opening 284 such that one end of each surface is closer to the center than the other end. As shown, three surfaces 288 are symmetrically arranged about the opening 284, with each surface angling towards the center of the opening in a direction extending clockwise. It will be appreciated, however, that any number of surfaces 288 can be provided symmetrically about the opening 284.

The roller cage 300 includes a tubular base 302. Openings 304 extend radially outward through the base 302 and are configured to receive the roller bearings 290. As shown, three roller bearings 290 are received in three radial openings 304 arranged symmetrically about the base 302. The roller bearings 290 are shown as cylindrical but could have alternative configurations, e.g., frustoconical or spherical. More or fewer roller bearings 290 and corresponding openings 304 can be provided in each clutch subassembly. An arm 306 extends radially outward from the base 302. A pin or projection 308 is formed on the arm 306 and extends substantially perpendicular to the arm. Other angles are contemplated.

The hub 310 is cylindrical and includes an outer surface 312 and an inner surface 314 defining an axially extending passage 316. The inner surface 314 is splined or otherwise configured to mate with the splined portion 210 of the spindle 192.

The actuating arm 330 is elongated and includes a base 332 and an opening 334 extending therethrough. Arms 340 extend in opposite directions from the base 332. A notch 342 is formed at the end/axial extent of each arm 340 for receiving the projection 308 of the roller cage 300.

When each clutch subassembly is assembled, the wedge ring 280 is positioned within the pocket 266 in the second passage 262. The projections 282 on the wedge ring 280 prevent relative rotation between the wedge ring and the housing 250. The base 302 of the roller cage 300 is positioned in the recess 264, which positions the base within the opening 284 of the wedge ring 280. The arm 306 on the roller cage 300 extends under (as shown) wedge ring 280 and into the first passage 260.

The roller bearings 290 are positioned in the openings 304 in the roller cage 300 and abut the angled surfaces 288 of the wedge ring 280. The number of roller bearings 290 in each clutch subassembly corresponds with the number of angled surfaces 288 on the associated wedge ring 280. In any case, the hub 310 is positioned within the tubular base 302 of the roller cage 300 and is concentric therewith. The inner surface 314 of the hub 310 receives the splined portion 210 of the spindle assembly 190 to rotatably couple the hub and spindle assembly together.

The actuating arm 330 is positioned in the recess 270 in the first passage 260 of the housing 250 such that the notches 342 on the arms 340 at least partially receive the projections 308 on the arms 306 of the roller cage 300. The solenoid 350 extends into the opening 334 of the actuating arm 330 such that the solenoid is capable of rotating the actuating arm about an axis 352. The solenoid 350 can be, for example, a bistable solenoid having a positive voltage polarity position and a negative voltage polarity position. That said, the clutch unit 240 is motor-less, gear-less, and does not require a constant voltage application to maintain any one position.

The clutch unit 240 is positioned over the exposed, splined portions 210 of the spindles 192 such that the splined inner surfaces 314 of the hubs 310 mesh with the splined portions. This positions the first ends 196 of the spindles 192 within the bases 302 of the hollow cages 300.

Figure 13A:
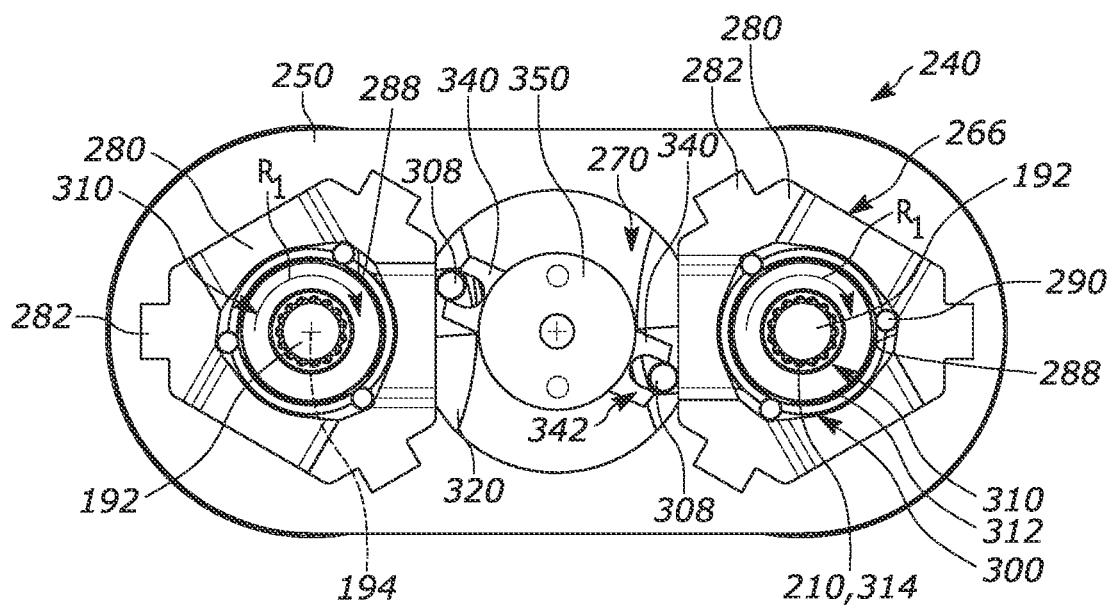
FIG. 13A is a schematic illustration of the clutch unit in a first condition.

The clutch unit 240 has a first condition/position (FIG. 13A) that allows the hubs 310 and, thus, allows the spindles 192 secured thereto to rotate in the manner indicated at $R_1$ (and the direction opposite $R_1$). In the first condition the solenoid 350 is rotated such that the notches 342 in the arms 340 partially receive the projections 308 on the roller cage 300. As a result, each roller cage 300 is oriented in a first rotational position relative to the respective axis 194 that places the roller bearings 290 at a first location along the angled surfaces 288 of the wedge ring 280. In this location, the roller bearings 290 are radially spaced from the outer surfaces 312 of the hubs 310. This allows the hubs 310/spindles 192 to rotate freely relative to the respective roller cages 300.

Figure 13B:
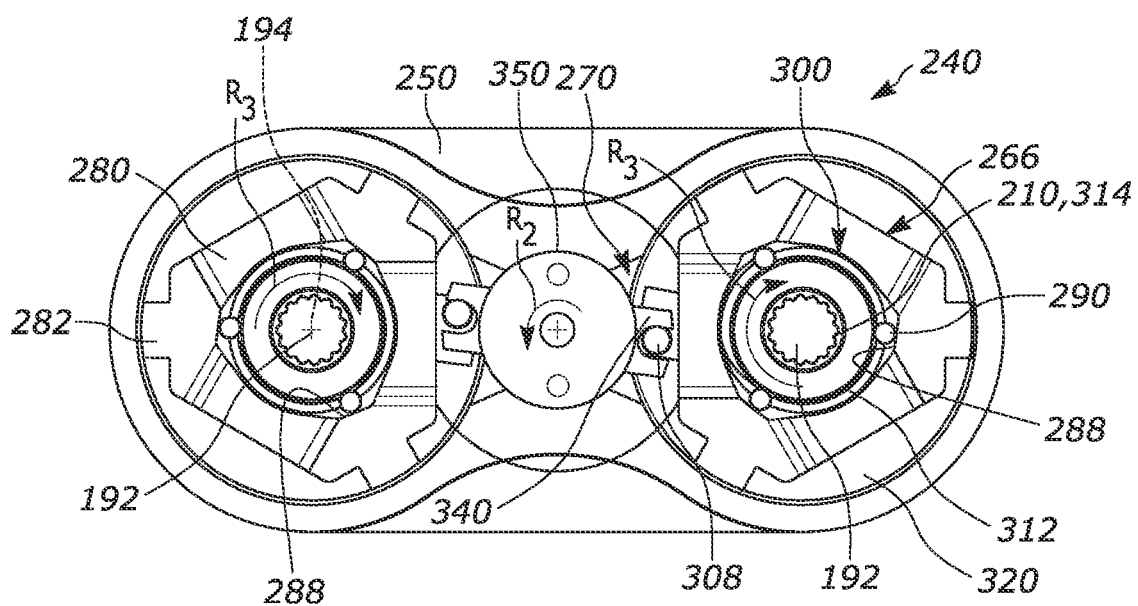
FIG. 13B is a schematic illustration of the clutch unit in a second condition.
Figure 14:
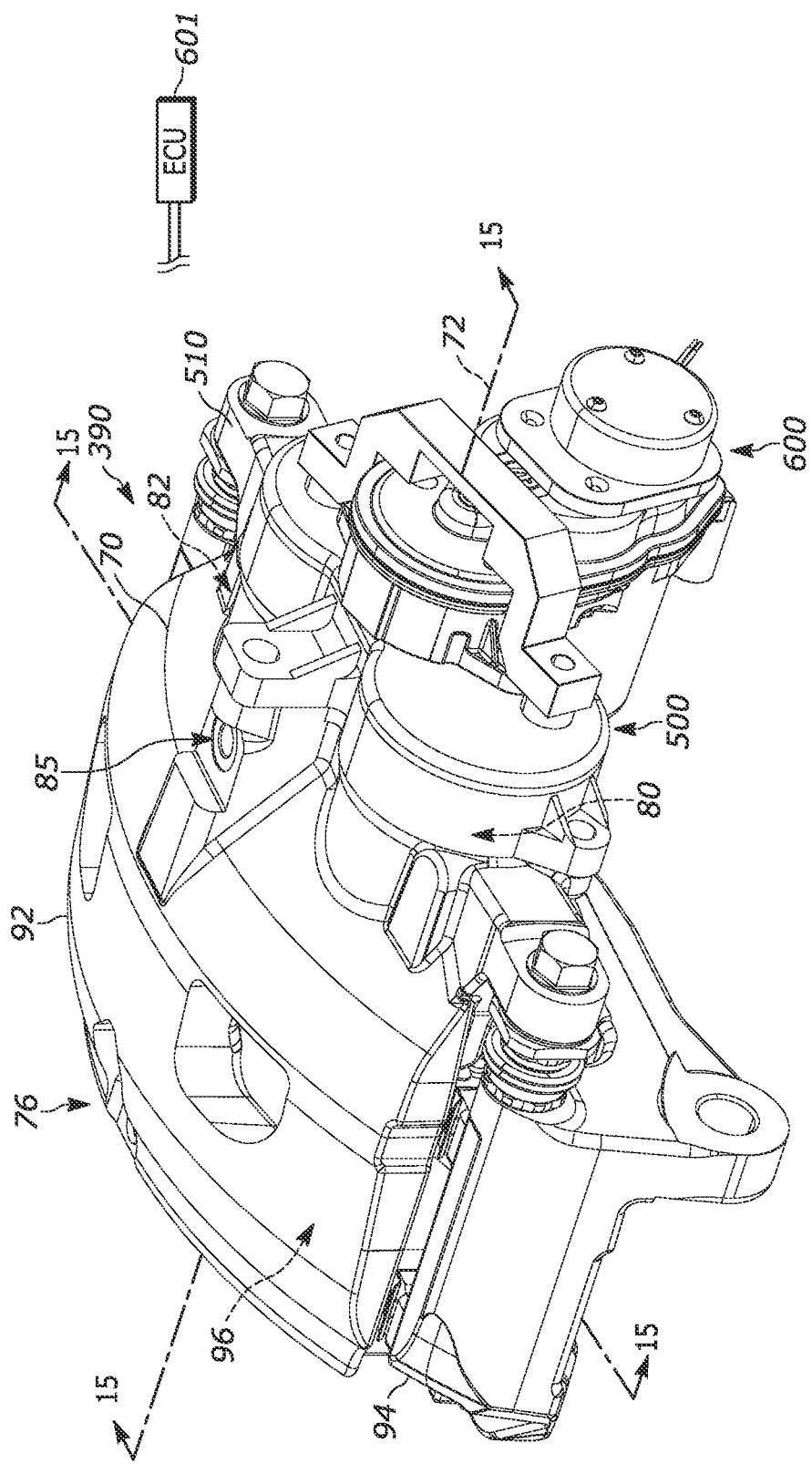
FIG. 14 is a schematic illustration of another example caliper assembly.

The clutch unit 240 has a second condition/position (FIG. 13B) that prevents the hubs 310 and spindles 192 secured thereto from rotating. To this end, the solenoid 350 can be actuated to rotate in the direction $R_2$ (CCW as shown), which rotates the arms 340 in the direction $R_2$. The rotating arms 340 move the projections 308 engaged therewith in the direction $R_3$ (CW as shown).

As a result, the roller cages 300 are rotated in the direction $R_3$ to a second rotational position relative to the axes 194, which moves the roller bearings 290 along and "up" the angled surfaces 288. By rolling up the surfaces 288, the roller bearings 290 are moved radially towards the hubs 310 until engaging the outer surfaces 312 thereof. More specifically, the roller bearings 290 become wedged or locked between the surfaces 288 and the outer surface 312 sufficient to prevent rotation of the hubs 310 and thereby prevent rotation of the spindles 192 connected thereto in the direction $R_1$. This, in turn, prevents back-drive of the pistons 102. Rotation of the spindles 192 in the direction opposite the direction $R_1$, however, is still permitted.

It will be appreciated that the solenoid 350 and actuating arms 330 can alternatively be configured such that the solenoid imparts linear motion on the actuating arms (not shown) which, in turn, impart rotational movement on the roller cages 300 to lock the roller bearings 290 in the manner described. In such a construction, the spindles 192 would still operate in the same manners when the clutch unit 240 is in the respective first and second conditions.

Returning to FIG. 5, during operation of the braking system 10, a service brake demand initiated by the system and/or vehicle operator causes hydraulic fluid to be delivered via the hydraulic line 64 to the inlet opening 85 of the housing 70 of at least one caliper assembly 60. In this example, service braking is shown for a single, rear end 26 wheel rotor 38.

The hydraulic fluid passes through the inlet opening 85, into the connecting passage 84, and subsequently into both the first and second passages 80, 82. The hydraulic fluid pressure builds within the passages 80, 82 and behind/upstream of the clips 170 in the passages 110 of the piston assemblies 100 until the fluid pressure is sufficient to urge the pistons 102 in the direction D towards the wheel rotor. More specifically, the pistons 102 are urged to move axially in the direction D but initially encounter the connection between the threaded components 142, 202.

At this time, the clutch unit 240 is in the first condition allowing free rotation of the spindles 192 about their respective axes 194. That said, urging the pistons 102 to move in the direction D causes the spindles 192 connected thereto to rotate in the direction opposite the direction $R_1$ (see FIG. 13A) relative to the pistons due to the threaded connection 142, 202. In other words, the position of the roller bearings 290 at the first location on the angled surfaces 288 allows the spindles 192 to rotate to accommodate axial movement of the pistons 102 towards and into engagement with the brake pad 37 on the wheel rotor 38. Consequently, the service brake is applied and the bridge 92 of the housing 70 elastically deforms in a known manner.

Advantageously, the pistons 102 can move in the direction D independent from one another when the clutch unit 240 is in the first condition as each spindle 192 is free to rotate independent of the other. As a result, the pistons 102 can move different distances in the direction D to account for pad and/or rotor wear. For example, the piston 102 in the first passage 80 can move a first distance in the direction D before engaging the brake pad 37. If the brake pad 37 is worn, however, the piston 102 in the second passage 82 may be required to move a second, greater distance in the direction D before engaging the brake pad. In each case, the fast lead connection 142, 202 facilitates rapid piston 102 movement in the direction D with little frictional resistance between the moving threads. Consequently, both pistons 102 will reach the brake pad 37 at substantially the same time regardless of any disparity in the degree of movement needed.

In any case, if the demand for service brakes is stopped, hydraulic fluid is no longer supplied to the inlet openings 85 and, thus, the pistons 102 are no longer urged in the direction D towards the brake pad 37. This allows the elastically deformed bridge 92, housing 70, and pads 37 to automatically relax and push the pistons 102 back towards the respective passages 80, 82 in the direction opposite the direction D. The clutch unit 240 remains in the first condition during this return and, thus, the spindles 102 are free to rotate in the direction $R_1$ to accommodate the axial return movement of the pistons. The fast lead threaded connection 142, 202 facilitates a rapid, reduced stress retreat of the pistons 102 away from the brake pad 37.

On the other hand, if the parking brake is demanded during application of the service brake, the clutch unit 240 is actuated to the second condition to lock the pistons 102 against the brake pad 37. More specifically, the solenoid 350 is actuated (FIG. 13B) to lock the roller bearings 290 against the hubs 310 and thereby lock the spindles 192 in place. To this end, rotation of the spindles 192 in the direction $R_1$ (back-drive) is prevented, whereas rotation of the spindles in the direction opposite the direction $R_1$ is permitted to permit the pistons 102 to advance further in the direction D where the application of additional hydraulic pressure is desired.

That said, when the clutch unit 240 is in the second condition and hydraulic pressure is released/removed, the pistons 102 cannot translate along/relative to the spindles 192 due to the threaded connection 142, 202 therebetween.

The pistons 102 are therefore locked in place so long as the solenoid 350 is in the second condition.

Advantageously, this allows the brake system to remove the hydraulic pressure from the caliper 60. In other words, the hydraulic fluid can be removed from the passages 80, 82 since the clutch unit 240 maintains the braking pressure between the pistons 102 and brake pad 37. The braking system 10 therefore does not rely on hydraulic fluid/pressure in order to hold the parking brake and is capable of maintaining substantially the same braking clamp force as the hydraulic system.

When the parking brake is no longer needed, e.g., driveaway release (DAR) or parking release event, the solenoid 350 is actuated to the first condition to move the roller bearings 290 along the angled surfaces 288 and out of engagement with the hubs 310. At the same time, hydraulic fluid is returned to the passages 80, 82 via the inlet opening 85 at an increased level, e.g., a 5% or 10% increase, relative to the hydraulic pressure previously applied at the time the parking brake was engaged (solenoid moved to second condition). As noted, the clutch unit 240 allows for additional rotation of the spindles 192 in the direction opposite the direction $R_1$ to enable the pistons to provide this additional/elevated clamping force. The increased hydraulic pressure on the pistons 102 helps to relieve the torque experienced by the hubs 310, thereby helping the solenoid 350 to move the roller bearings 290 off the surfaces 288, and complete the transition to the first condition position.

In other words, the increased hydraulic pressure facilitates movement of the solenoid 250 to the first condition. That said, moving the roller bearings 290 out of engagement with the hubs 310 and subsequent hydraulic pressure release enables rotation of the spindles 192, which allows the pistons 102 to move axially along and relative to the spindles back to their initial condition under the influence of the relaxing bridge 92 of the housing 70.

FIGS. 14-22B illustrate another example caliper assembly 390 in accordance with the present invention. Components in the caliper assembly 390 that are similarly or identically constructed to components in the caliper assembly 60 are given the same reference number. That said, the specific discussion of those components is reduced or omitted in the interest of brevity.

Figure 16:
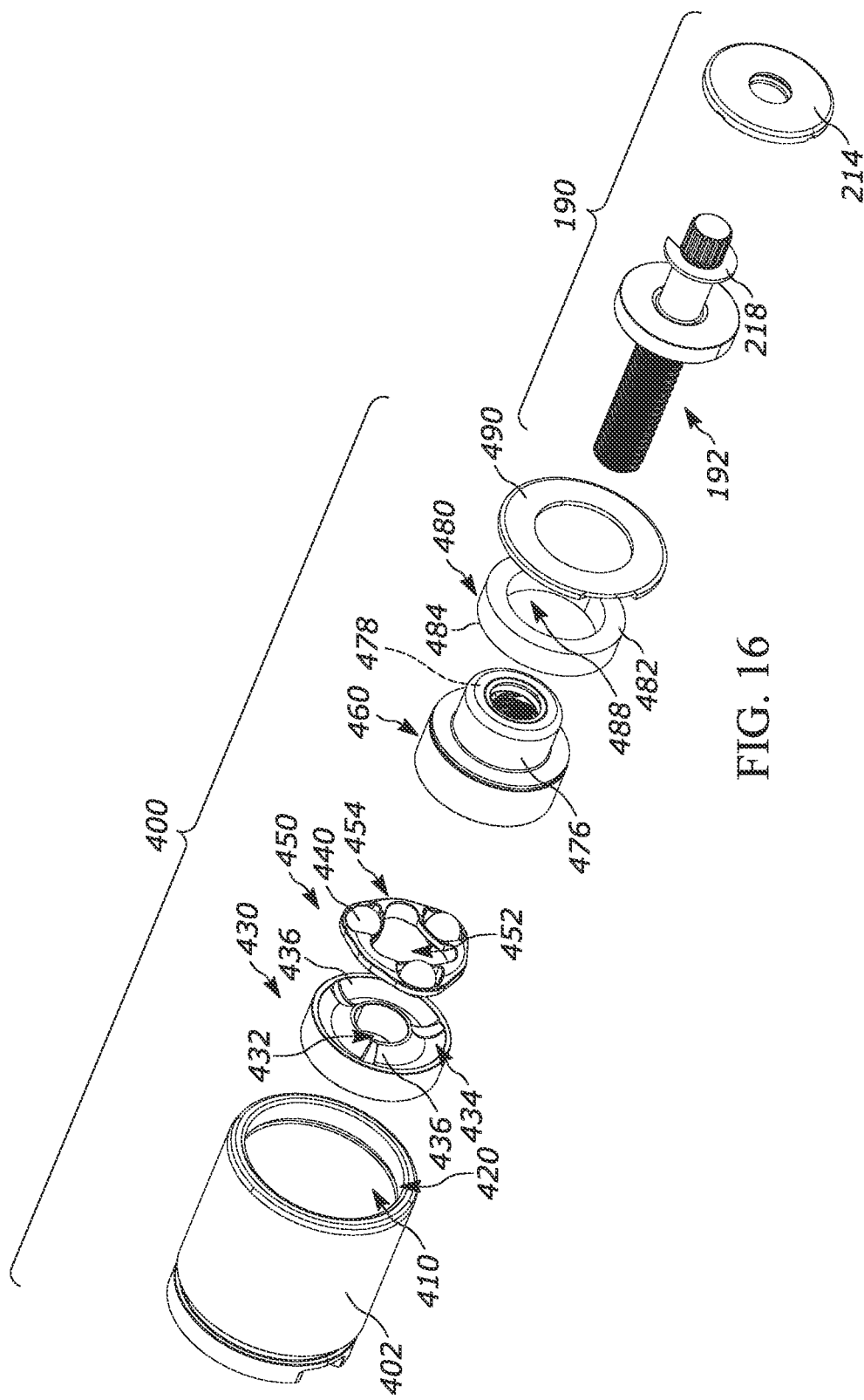
FIG. 16 is an exploded view of a portion of the caliper assembly of FIG. 14.
Figure 17:
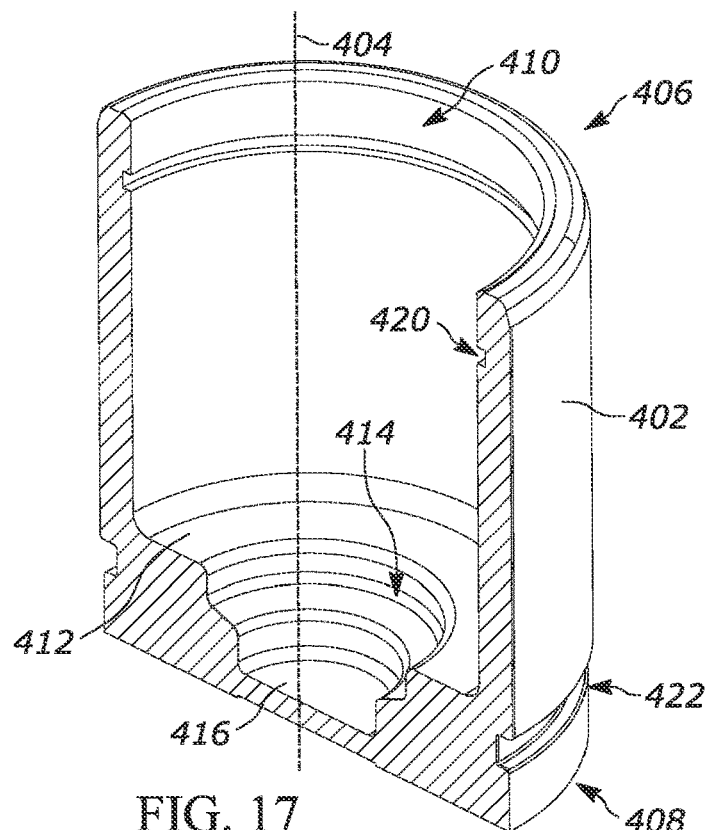
FIG. 17 is a section view of a piston of the caliper assembly of FIG. 14.
Figure 18:
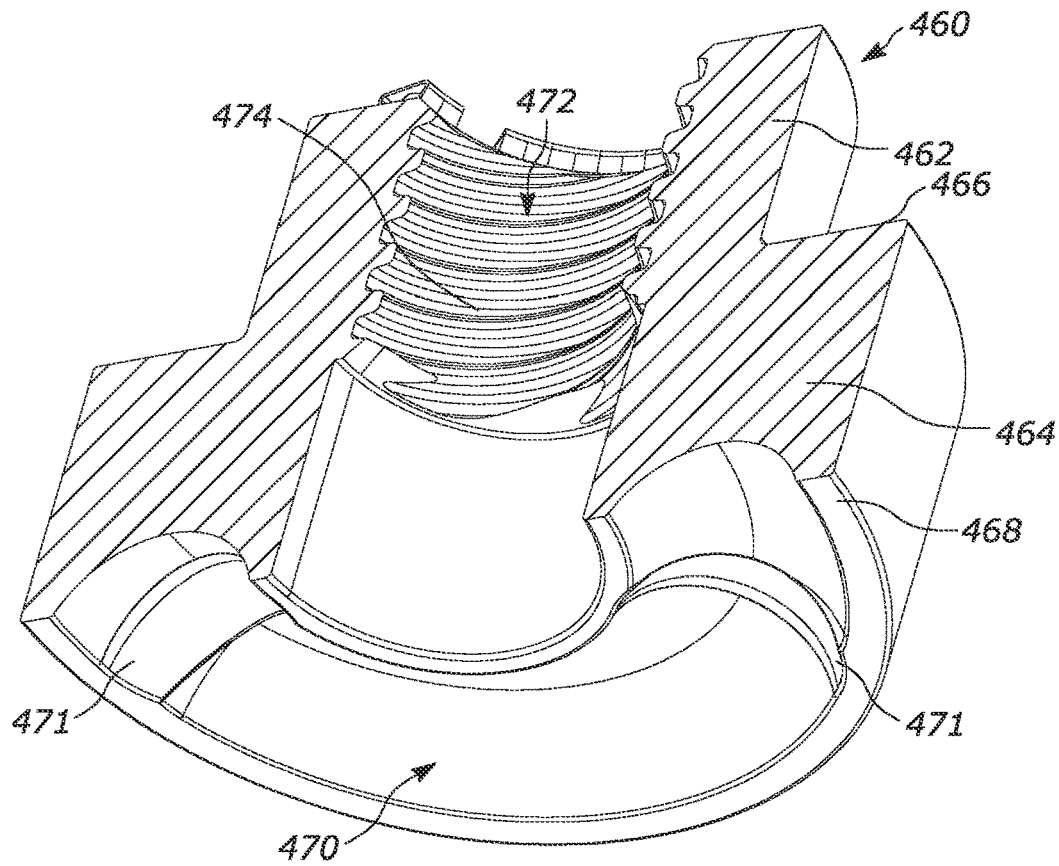
FIG. 18 is a section view of a ramp nut of the caliper assembly of FIG. 14.

The piston assembly 400 includes a piston 402 extending along a centerline 404 from a first end 406 to a second end 408 (see FIGS. 16-17). A first passage 410 extends from the first end 404 towards the second end 408 and terminates at an axial end surface 412. A second passage extends 414 from the end surface 410 towards the second end 408 and terminates at an axial end surface 416. A first annular recess 420 is provided in the first passage 410 and encircles the centerline 404. A second annular recess 422 is provided on the exterior of the piston 402 at the second end 408 thereof.

The piston assembly 400 further includes an annular, stationary ramp 430. A central passage 432 extends through the ramp 430. An annular track 434 encircles the central passage 432 and includes a series of ramps symmetrically arranged about the central passage. A bearing cage 450 (FIG. 16) is aligned with the annular track 434 and includes a central passage 452 and pockets 454 arranged around the central passage for receiving roller bearings 440. In this example, the roller bearings 440 are spherical and extend to both sides of the bearing cage 450.

A ramp nut 460 (FIG. 18) is provided in the first passage 410 of the piston 402. The nut 460 includes a base 462 and a flange 464 extending radially outward from the base. The flange 464 includes a first axial end surface 466 and a second axial end surface 468. A central passage 472 extends the entire length of the ramp nut 460 through the base 462 and the flange 464. An annular track 470 is formed in the second axial end surface 468 and includes a series of ramps 471 symmetrically arranged about the central passage 472. Threads 474 are provided along a portion of the central passage 472. A cage 476 extends over the base 460 and engages the spring 480 at end surface 484 (see also FIGS. 15-16). The cage 476 encloses a thrust bearing 478 and presses the thrust bearing against the axial end of the base 462.

A spring 480 (FIG. 16) is also provided in the first passage 410 of the piston 402. The spring 480 includes first and second axial end surfaces 482, 484. An inner surface defines a central passage 488 extending the entire length of the spring 480 from the axial end surface 482 to the axial end surface 484.

Figure 15:
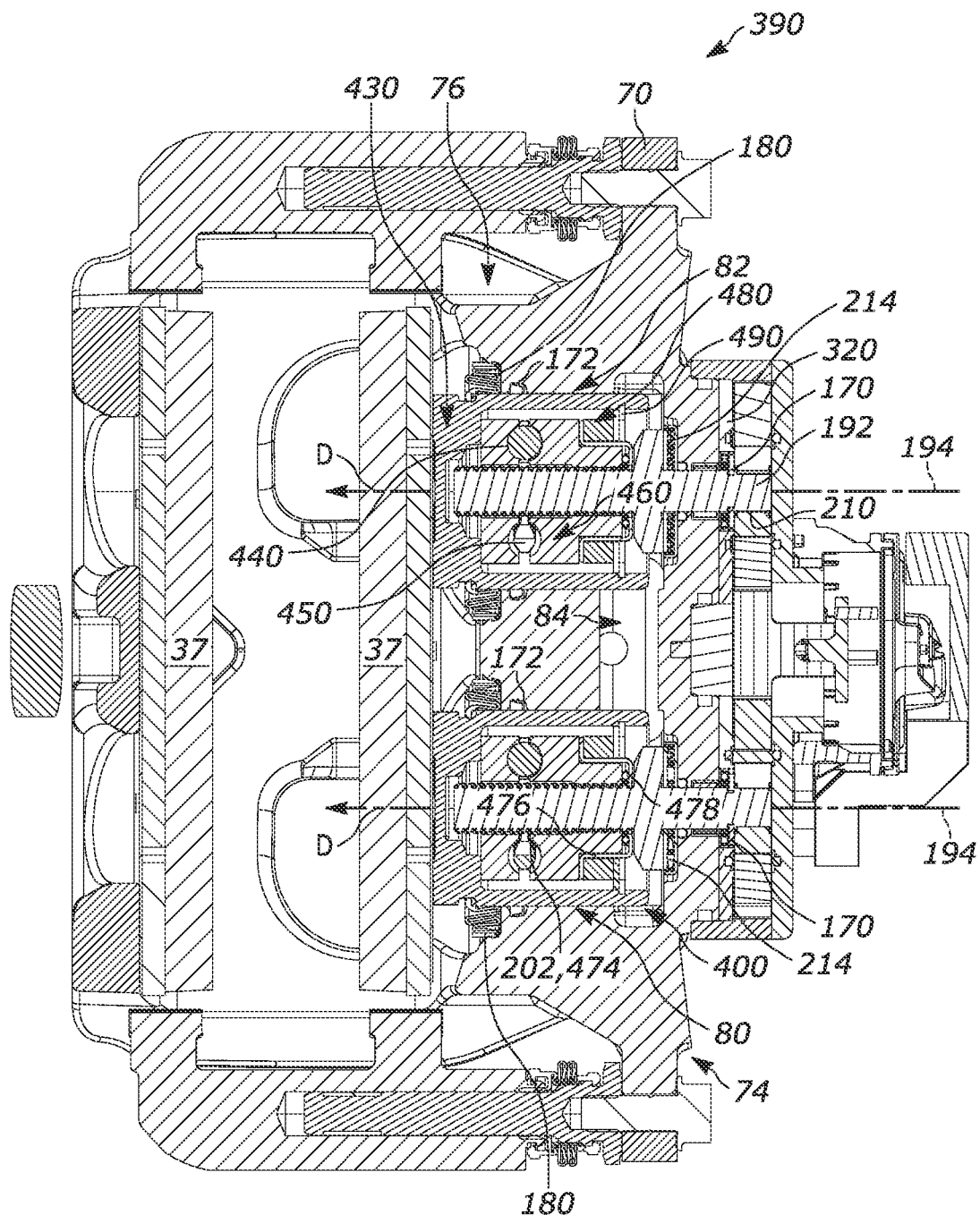
FIG. 15 is a section view taken along line 15-15 of FIG. 14.

Referring to FIG. 15, the stationary ramp 430 abuts the end surface 412 in the piston 402. The roller bearings 440 are positioned in the annular track 434 of the stationary ramp 430. The ramp nut 460 is positioned in the first passage 410. The roller bearings 440 are received in the annular track 470 such that the roller bearings are movable along and relative to both the annular recess in the ramp nut 460 and the annular track 434 in the stationary ramp 430.

The base 462 of the ramp nut 460 extends through the central passage 488 in the spring 480 such that the end surface 484 of the spring is adjacent the end surface 466 of the flange 464 of the ramp nut.

A clip 490 forms a snap-fit with the annular recess 420 of the piston 402. The clip 490 abuts the spring 480 on the end 482 and the spring 480 axial end surface 484 abuts the cage 476. Due to the presence of the thrust bearing 478, the spring 480 urges or presses the ramp nut 460 against the roller bearings 440. Since the roller bearings 440 press against the stationary ramp 430, which presses against the piston 102, the roller bearings are held in place in the tracks 430, 470 and loaded up to a force equal to the pre-loaded (or compressed) spring 480.

The seal 172 extends around the exterior of the second end 408 of the piston 402. The piston boot excluder 180 is provided in the outer recess 422 and helps prevent dirt and debris from entering the passages 80, 82. The spindle 192 extends through the passages 432, 452, 472, 488 and is threadably engaged with the threads 474 on the ramp nut 460.

Figure 19:
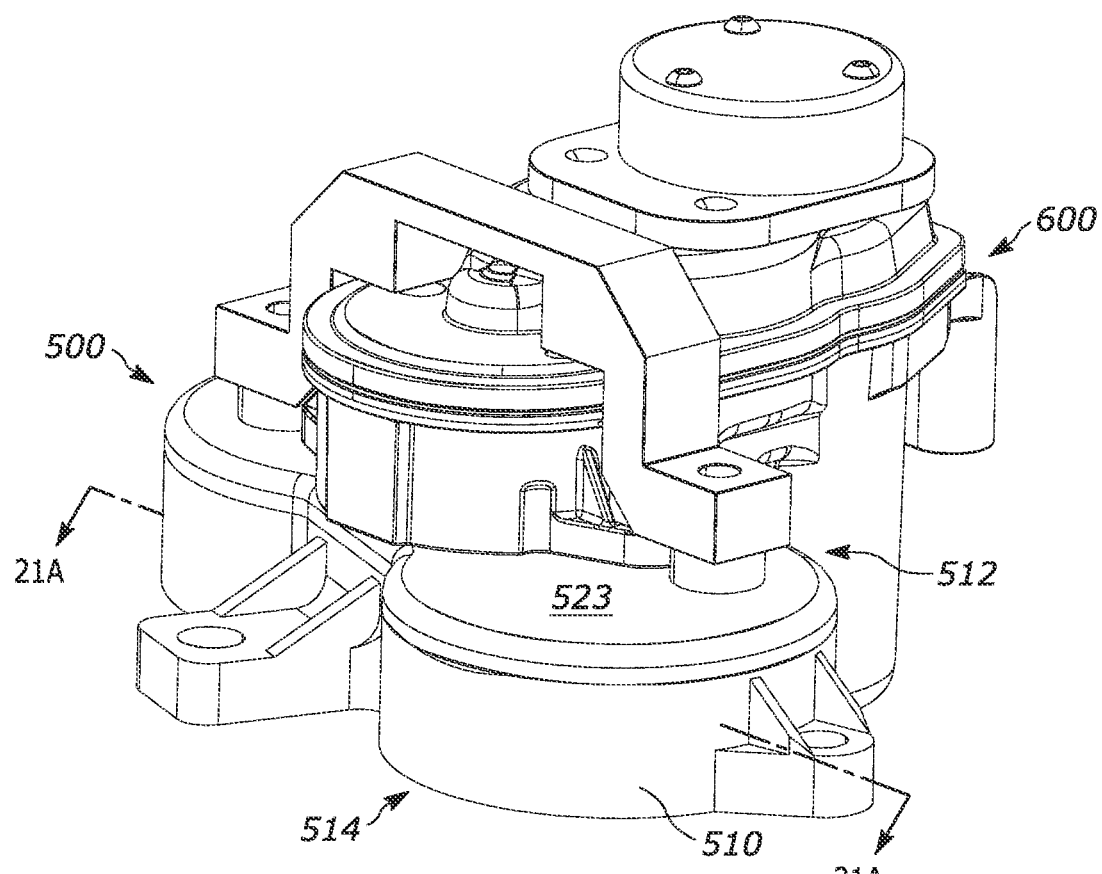
FIG. 19 is a front view of a clutch unit of the caliper assembly of FIG. 14.
Figure 20:
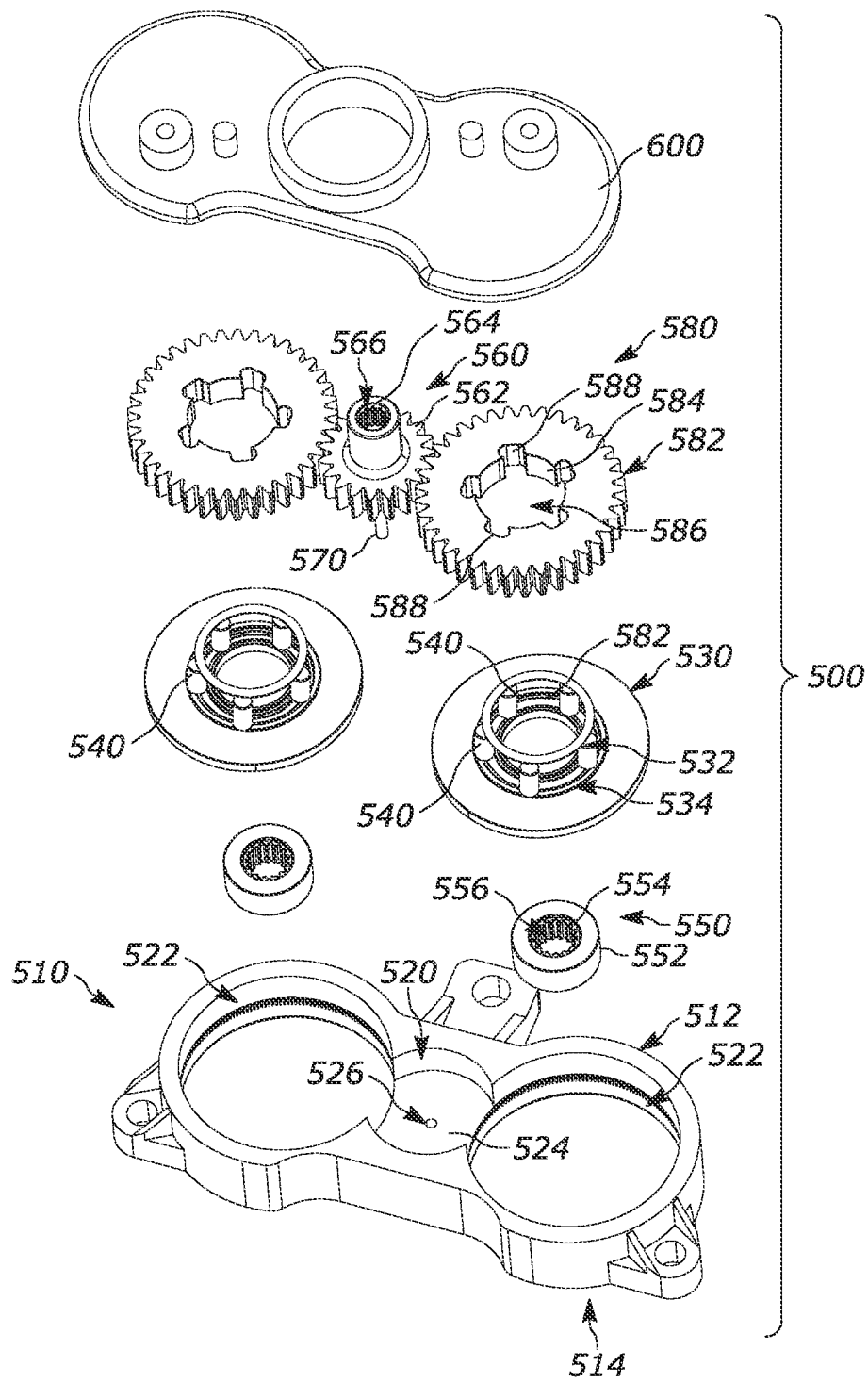
FIG. 20 is an exploded view of the clutch unit of FIG. 19.

As shown in FIGS. 19-20, the clutch unit 500 is connected to an motor assembly 600. The clutch unit 500 and motor assembly 600 can be separate components coupled together (as shown) or integrally formed together in a single assembly (not shown). In any case, The clutch unit 500 is connected to the first end 74 of the housing 70 and includes a housing 510 having a first side 512 and a second side 514. A first passage 520 extends from the first side 512 towards the second side 514 and terminates at an axial end surface 524. An opening 526 extends into the end surface 524. A pair of second passages 522 extends entirely through the housing 510 and intersect the first passage 520. A cap 523 closes the passages 522.

A plate 530 is provided in each second passage 522. The plate 530 includes a central opening 532 and an annular recess 534 encircling the opening. Roller bearings 540 are provided in the annular recess 534. The roller bearings 540 can be cylindrical and symmetrically arranged about the opening 532.

A hub 550 is provided in the opening 532 in the plate 530. The hub 550 is cylindrical and includes an outer surface 552 and an inner surface 554 defining an axially extending passage 556. The inner surface 554 is splined or otherwise configured to mate with the splined portion 210 of the spindle 192.

The clutch unit 500 further includes a drive gear 560 and a pair of driven gears 580. Teeth 562 extend radially outward from the drive gear 560 and mesh with similarly shaped teeth 582 on the driven gears 580. An inner surface 564 extends into through the drive gear 560 and defines a splined passage 566. An opening (not shown) extends from the passage 566 through the end of the drive gear 560. An axle 570 is received in the opening in the drive gear 560 and the opening 526 in the housing 510.

Figure 21:
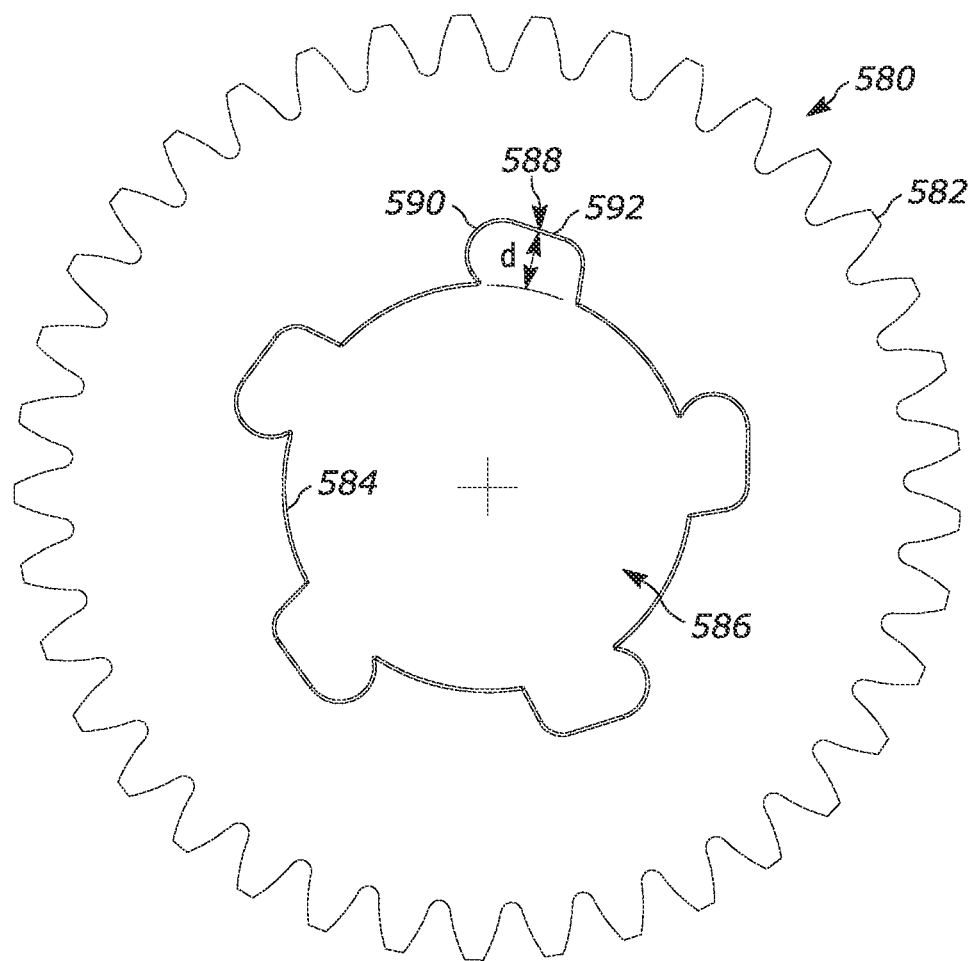
FIG. 21 is a top view of a driven gear of the clutch unit of FIG. 19.

Referring to FIG. 21, each driven gear 580 includes an inner surface 584 defining a central passage 586 and pockets 588 arranged circumferentially about the central passage. Each pocket 588 is defined by a first, curved surface 590 and a second, angled surface 592. To this end, the surface 592 is angled such that the distance d between the surface and the central passage 586 decreases in a direction extending away from the first surface 590 (CW as shown). The roller bearings 540 are positioned within the pockets 588 when the clutch unit 500 is assembled.

Figure 22A:
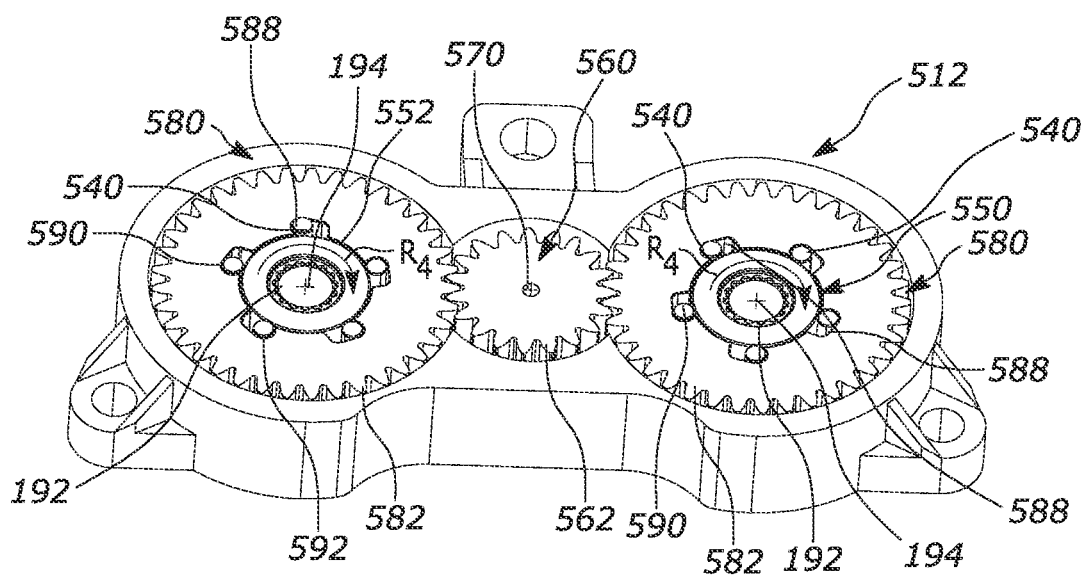
FIG. 22A is a schematic illustration of the clutch unit of FIG. 19 in a first condition.
Figure 22B:
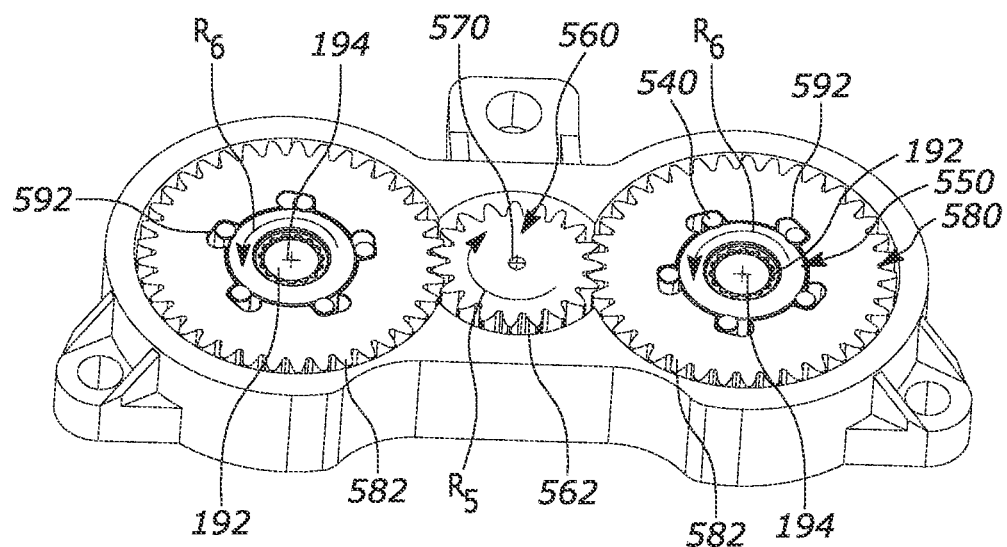
FIG. 22B is a schematic illustration of the clutch unit of FIG. 19 in a second condition.

The clutch unit 500 is positioned over the exposed, splined portions 210 of the spindles 192 such that the splined inner surfaces 554 of the hubs 550 mesh with the splined portions of the spindles (FIG. 22A). This positions the first ends 196 of the spindles 192 within the bases 302 of the hollow cages 300.

The motor assembly 600 is coupled to the splined passage 566 of the drive gear 560 for rotating the same. The motor assembly 600 includes a motor, a gear stage assembly that can be adjusted depending on the application, and solenoid brake, e.g., normally locked, spring loaded brake for selectively allowing and preventing rotation of the motor and gear stage assembly (not shown).

The clutch unit 500 has a first condition (FIG. 22A) that allows the hubs 550 and, thus, allows the spindles 192 secured thereto to rotate in the manner indicated at $R_4$. In particular, in the first condition the motor assembly 600 is unactuated, which places/maintains the roller bearings 540 against the first surfaces 590 of the pockets 588. In this location, the roller bearings 540 are radially spaced from the outer surfaces 552 of the hubs 550. This allows the hubs 550/spindles 192 to rotate freely in the direction $R_4$ (and the direction opposite the direction $R_4$) relative to the respective driven gears 580.

The clutch unit 500 has a second condition (FIG. 22B) that prevents the hubs 550 and spindles 192 secured thereto from rotating. In particular, the motor assembly 600 is actuated to rotate the drive gear 560 in the direction $R_5$ (CW as shown), which rotates the driven gears 580 in the direction $R_6$ (CCW as shown). The driven gears 580 rotate relative to the roller bearings 540 and, thus, rotating the driven gears in the direction $R_6$ moves the pockets 588 circumferentially relative to the stationary roller bearings 540. Consequently, each roller bearing 540 becomes spaced from the first surface 590 of the respective pocket 588 and ultimately wedged between the angled surface 592 and the outer surface 552 of the hub 550 sufficient to prevent rotation of the hubs and thereby prevent rotation of the spindles 192 connected thereto.

At the same time, the spindles 192 are also rotated in the direction $R_6$. When this occurs, only the spindles 192 initially rotate to move the pistons 402 and ball ramp assembly (including both stationary ramps 430, ramp nuts 460, roller bearings 440, spring 480, thrust bearings 478, clips 490) connected thereto toward the brake pad 37 at low load. When the pistons 402 contact the brake pad 37 and develop some small level of clamp force, the spindles 192 and ramp nuts 460 rotate together due to the threaded connection 202, 474 therebetween. The ramp 430, however, remains stationary.

That said, rotating the ramp nuts 460 relative to the stationary ramps 430 causes the roller bearings 440 to roll "up" the ramps 436, 471 in the respective tracks 434, 470. As a result, the ramp nut 460 in effect pushes the stationary nut 430 in the direction D through the roller bearings 440. This, in turn, applies sufficient clamp force to the brake pads 37 to park the vehicle without the need of assistance from the hydraulic brake system.

The clutch unit 500 operates in cooperation with the service brake in the same manner as the clutch unit 240 described above. That said, when the pistons 402 are fully retracted into the passages 80, 82 and the motor assembly 600 is powered off, the clutch unit 500 is disengaged from the hubs 550 so the spindles 192 can freely rotate, thereby allowing normal service braking to take place. Hydraulic pressure supplied to the passages 80, 82 urges the pistons 402 to come into contact with pad 37; as the pistons move, the corresponding spindles 192 rotate in response.

The clutch unit 500 is disengaged from the spindles 192/hubs 550 when the pistons 402 are under hydraulic pressure and, thus, the pistons are allowed to move axially in the direction D independent from one another when the clutch unit is unactuated. As a result, the pistons 402 can move different distances in the direction D to account for wear on the brake pad 37.

When it is desirable to apply and maintain a parking brake on the wheel rotor 38 without hydraulic assistance, an ECU 601 (see FIG. 14) directs electrical power of polarity A to be applied to the motor assembly 600. This causes the solenoid brake therein to unlock so the gears, including the driven gears 580, rotate in the direction $R_6$. As the driven gears 580 move in the apply direction $R_6$, the clutch unit 500 engages the hubs 550, thereby rotating the spindles 192 and thereafter causing the roller bearings 440 to roll "up" the ramps 436, 471 to clamp the rotor 38. When the ECU 601 detects sufficient current draw from the motor assembly 600, the ECU shuts off power to the motor assembly 600 which causes the solenoid brake therein to automatically lock, which locks the motor and gear train assembly connected thereto to prevent rotation of the spindles 192.

When it is desirable to release the parking brake, thereby allowing wheel rotor 38 to be able to rotate without frictional drag, electrical power of polarity opposite A is applied to motor assembly 600 causing the driven gears 580 to rotate in an opposite direction of direction $R_6$. This reduces the clamp force up to zero and with continued electrical power the clutch unit 500 disengages the hubs 550. Electrical power is then turned off, which causes the solenoid brake to automatically lock. Thereafter, the spindles 192 may rotate freely so service brake events can take place normally.

It will be appreciated that although the caliper assemblies 60, 390 are shown and described as dual piston assemblies one a single side of the rotor, each respective caliper assembly can alternatively be configured as a single piston assembly. In such constructions, the clutch unit 240, 500 would be modified accordingly, e.g., reducing the number of hubs, wedge rings, driven gears, etc.

Figure 5:
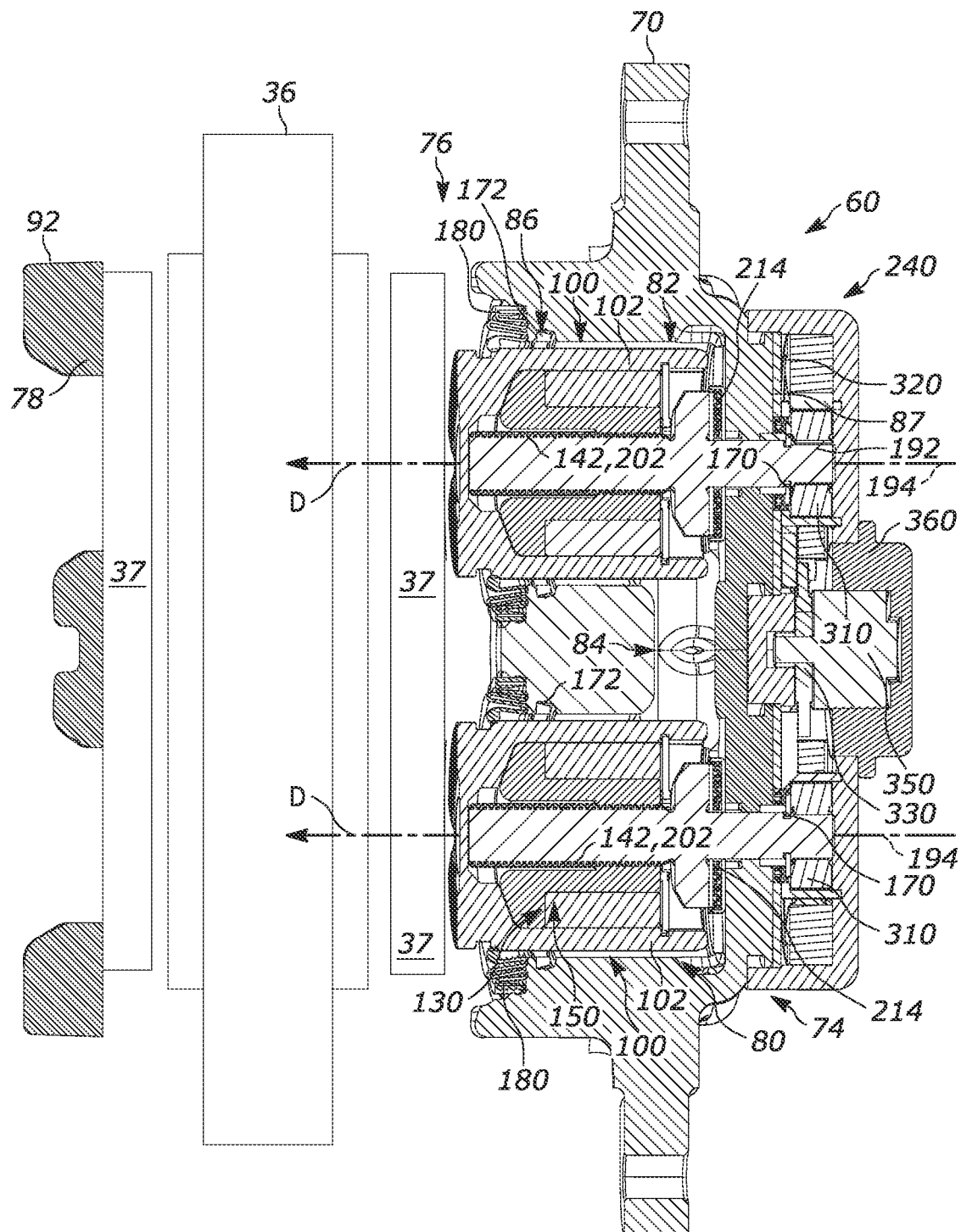
FIG. 5 is a section view taken along line 5-5 of FIG. 3.
Figure 6:
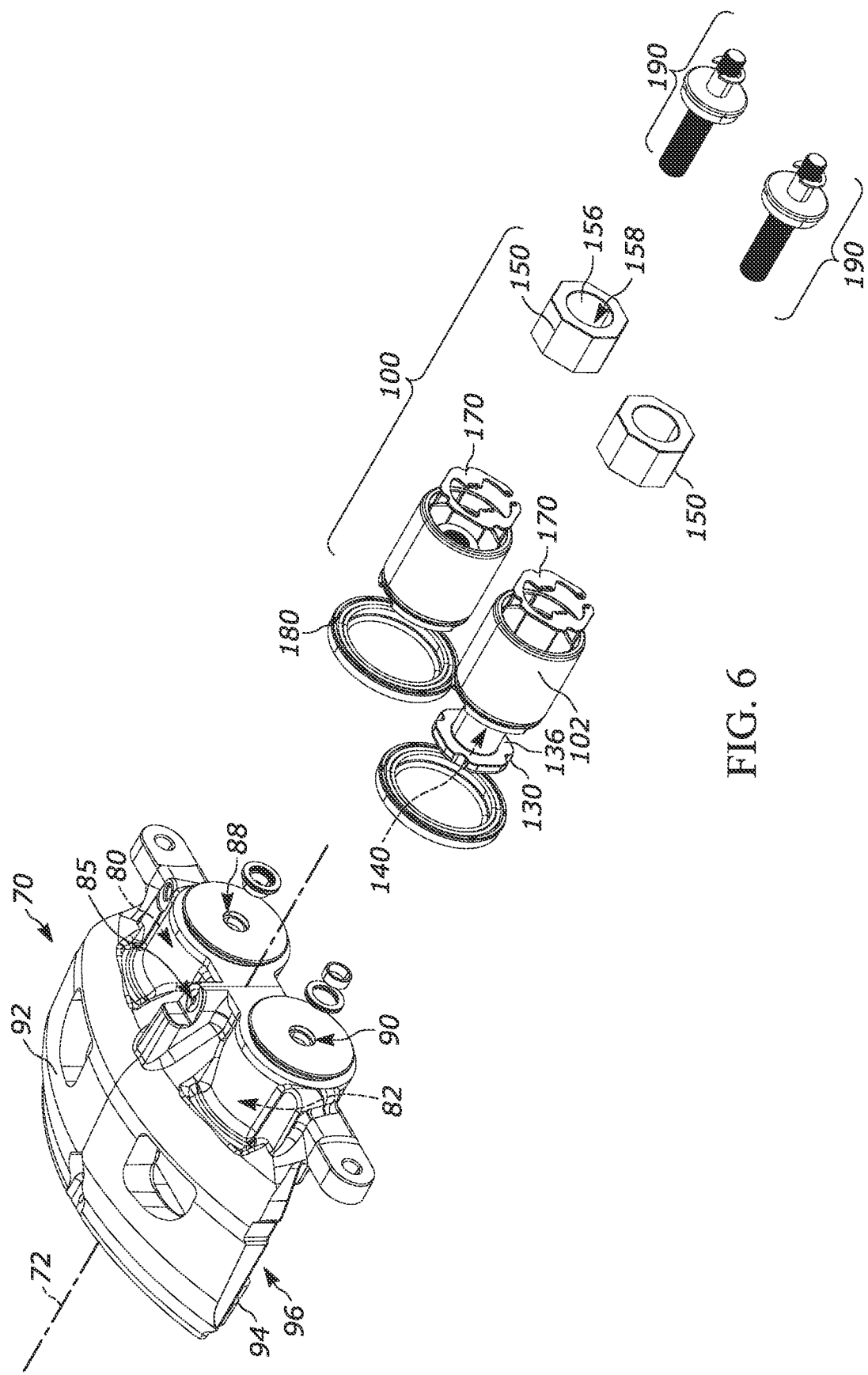
FIG. 6 is an exploded view of a portion of the caliper assembly.

Moreover, one or more pistons can be provided on the inboard side of the rotor (as shown in FIGS. 5 and 15), the outboard side of the rotor, or both sides of the rotor. A caliper assembly can be associated with any number of these pistons. For example, caliper assemblies can be provided on both sides of the rotor 38 of FIG. 5 and secured to one another such that the piston(s) on opposite sides of the rotor oppose one another. That said, one or more pistons can be provided on one or both sides of the rotor and operate with an associated clutch unit as previously discussed.

With this in mind, FIGS. 23A-25 illustrate another example caliper assembly 650 configured as a single piston assembly. Components in the caliper assembly 650 that are similarly or identically constructed to components in the caliper assembly 390 are given the same reference number. Components in the assembly 650 that are different than their corresponding component in the assembly 390 are given the suffix "a".

In the construction of FIGS. 23A-25, the components of the clutch unit 500a are provided within the housing 70 and a gear unit 502 connects the clutch unit to the motor assembly 600. Referring to FIG. 23B, the spindle 192a extends from the first end 196a to the second end 198a. The first end 196a, however, does not extend out of the passage 80 in the housing 70, but instead terminates therein. Consequently, an adapter 660 extends over the first end 196a and selectively couples the spindle 192a to a gear (not shown) of the gear unit 500a.

More specifically, the adapter 660 extends along the centerline 194a from a first end 662 to a second end 664. The adapter includes a base 670 and a projection 672 extending from the base to the first end 662. The projection 672 extends out of the housing 70 and is received by the gear (not shown) of the gear unit 502. The base 670 extends to the second end 664 and includes a pocket or recess 674 for receiving the first end 196a of the spindle 192a.

Figure 23A:
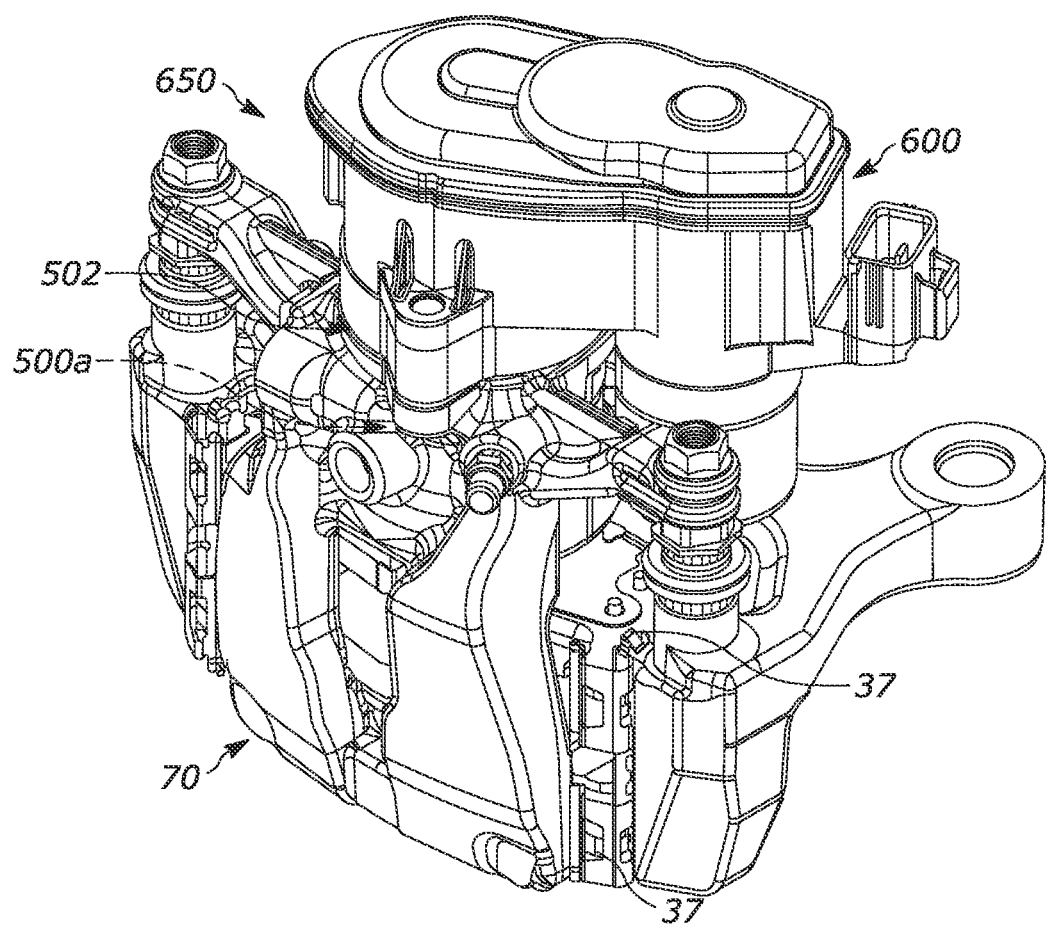
FIG. 23A is a schematic illustration of a single piston caliper assembly.
Figure 23B:
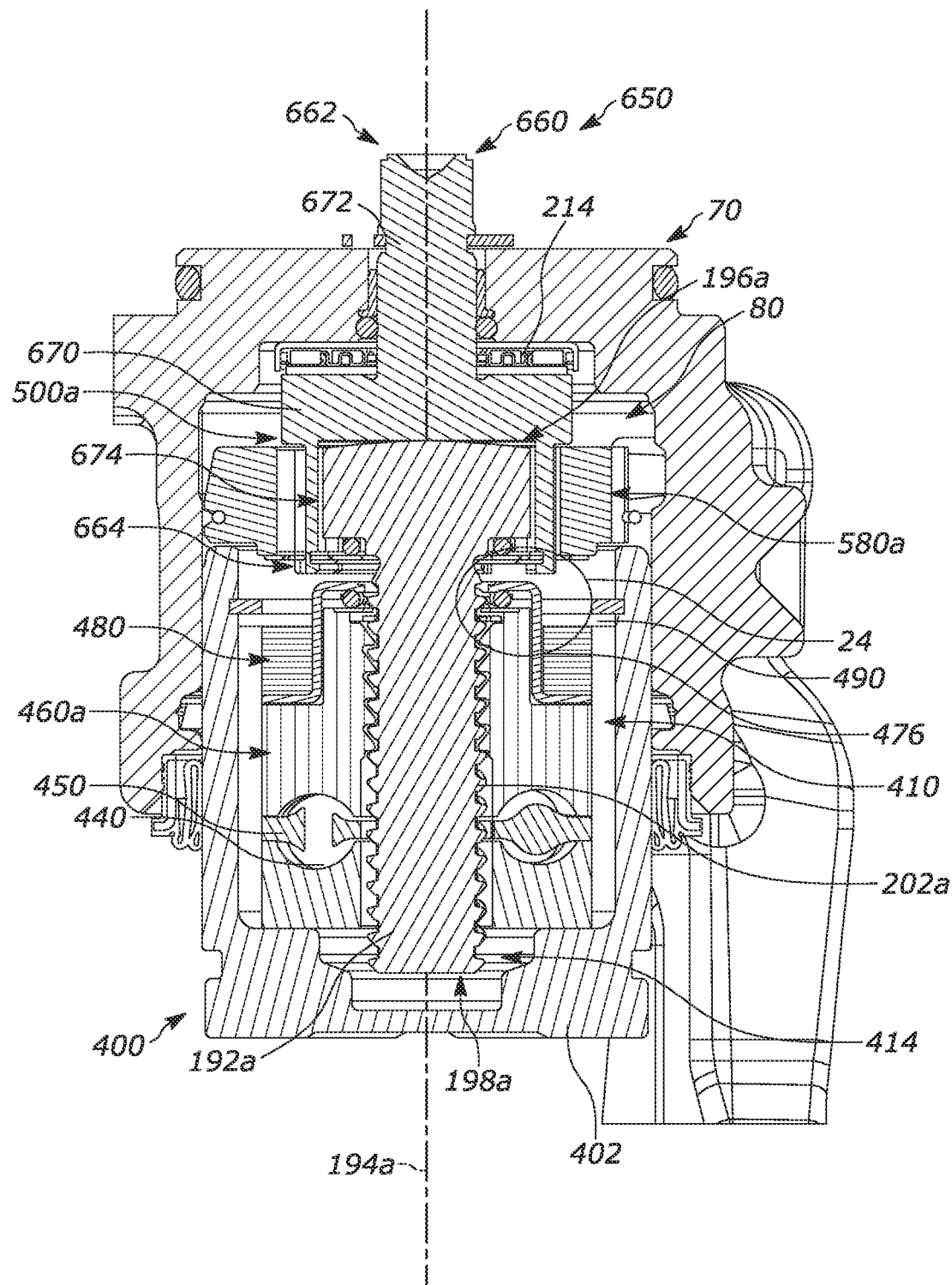
FIG. 23B is a section view of the caliper assembly of FIG. 23A.
Figure 23C:
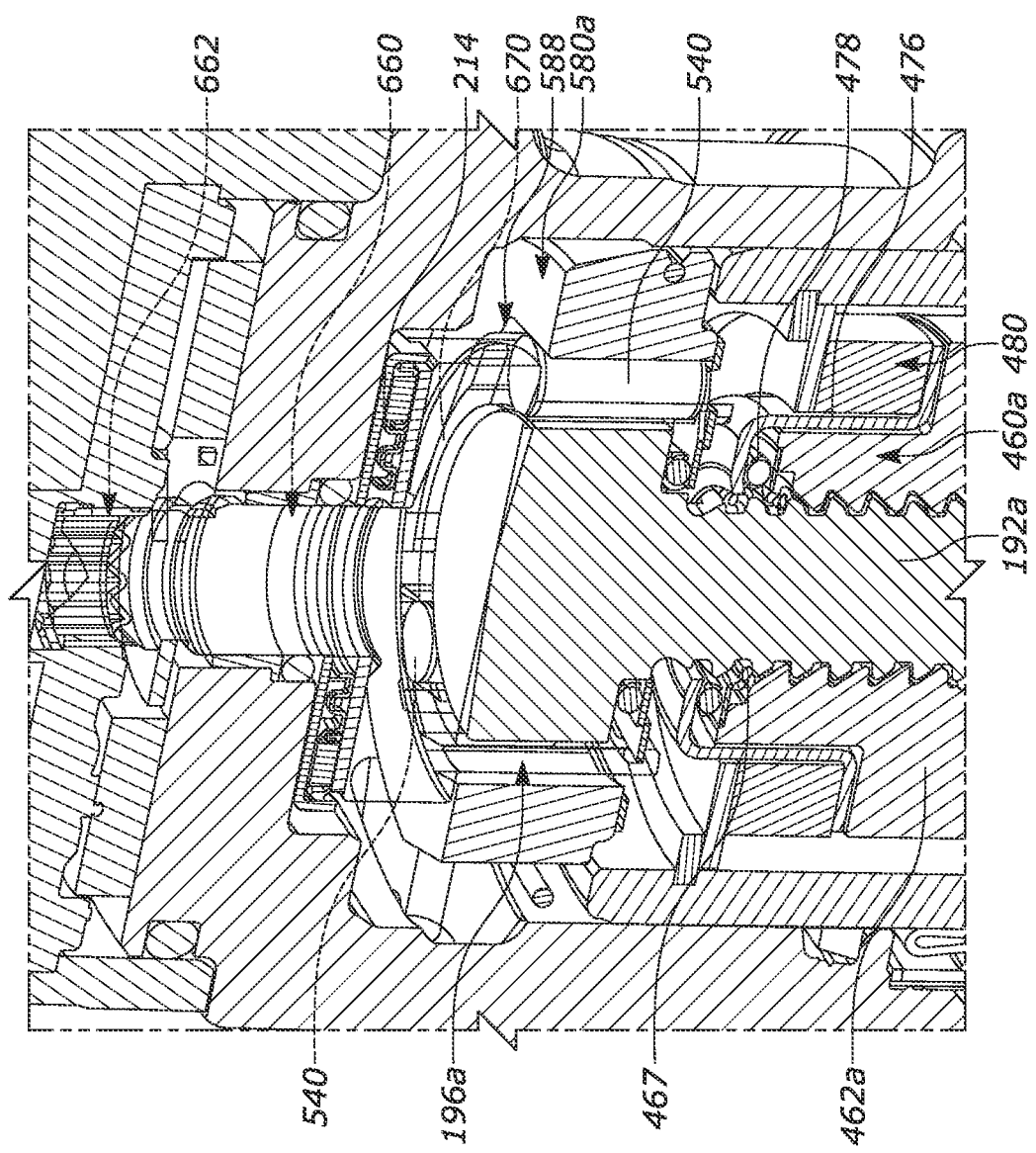
FIG. 23C is another section view of the caliper assembly of FIG. 23A.

Both the rollers 540 and the gear 580a as positioned around the first end 196a of the spindle 192a (FIG. 23C). In particular, the rollers 540 are positioned radially between the base 670 and the pockets 588 of the gear 580a. The adaptor 660 can be rotated by the motor assembly 600 to selectively move the rollers 540 into and out of engagement with the first surfaces 590 of the pockets 588 to thereby selectively allow (in the former case) and prevent (in the latter case) rotation of the spindle 192a.

With this in mind, the parking brake is thereby applied and released by the motor assembly 600 in the same manner as described above. To this end, the base 670 can include projections or fingers (not shown) for moving the rollers 540 within and relative to the pockets 588 in response to rotation of the adaptor 660 by the motor assembly 600. In any case, when the parking brake is applied, all the clamp force loads experienced by the spindle 192a are transferred to the base 670 which, in turn, transfers the clamp forces loads into the thrust bearing 214 and ultimately into the housing 70.

Figure 24:
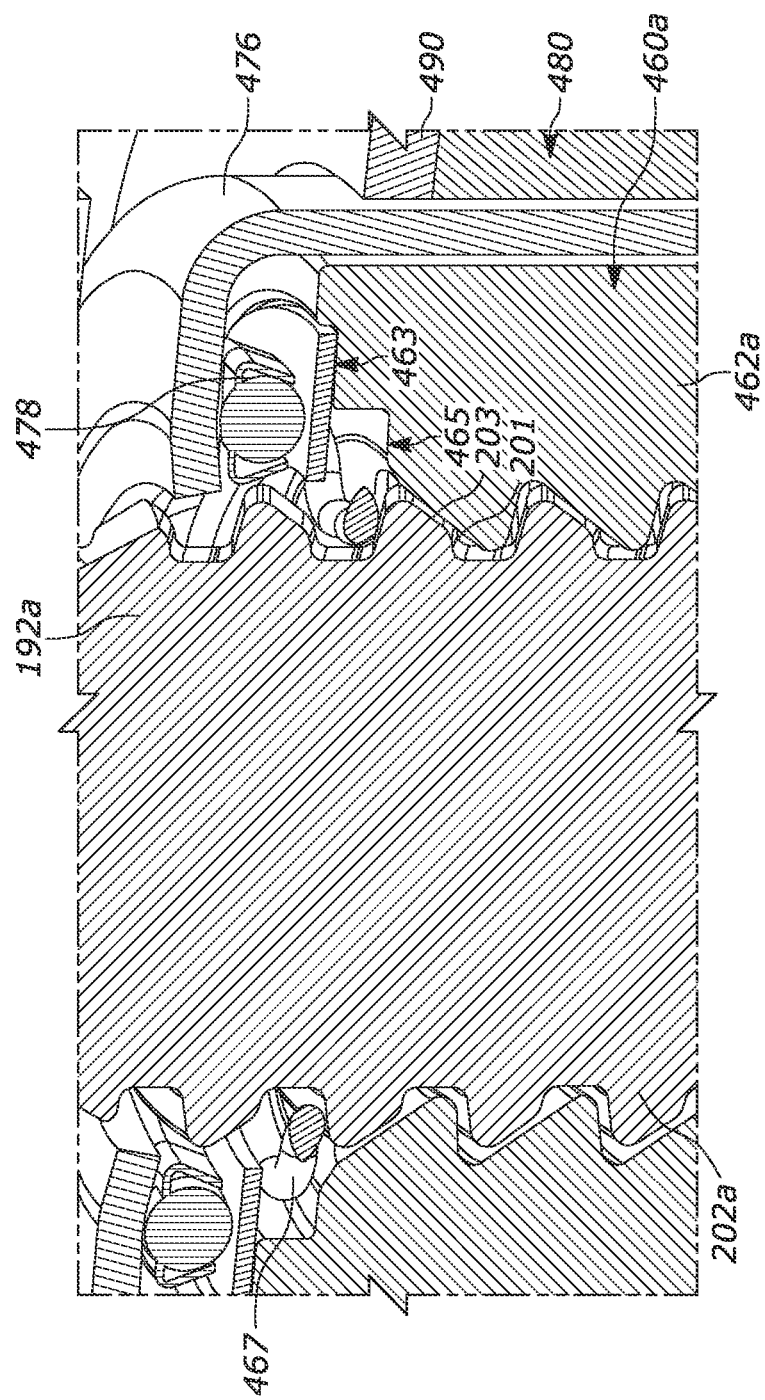
FIG. 24 is an enlarged view of a portion of FIG. 23B.
Figure 25:
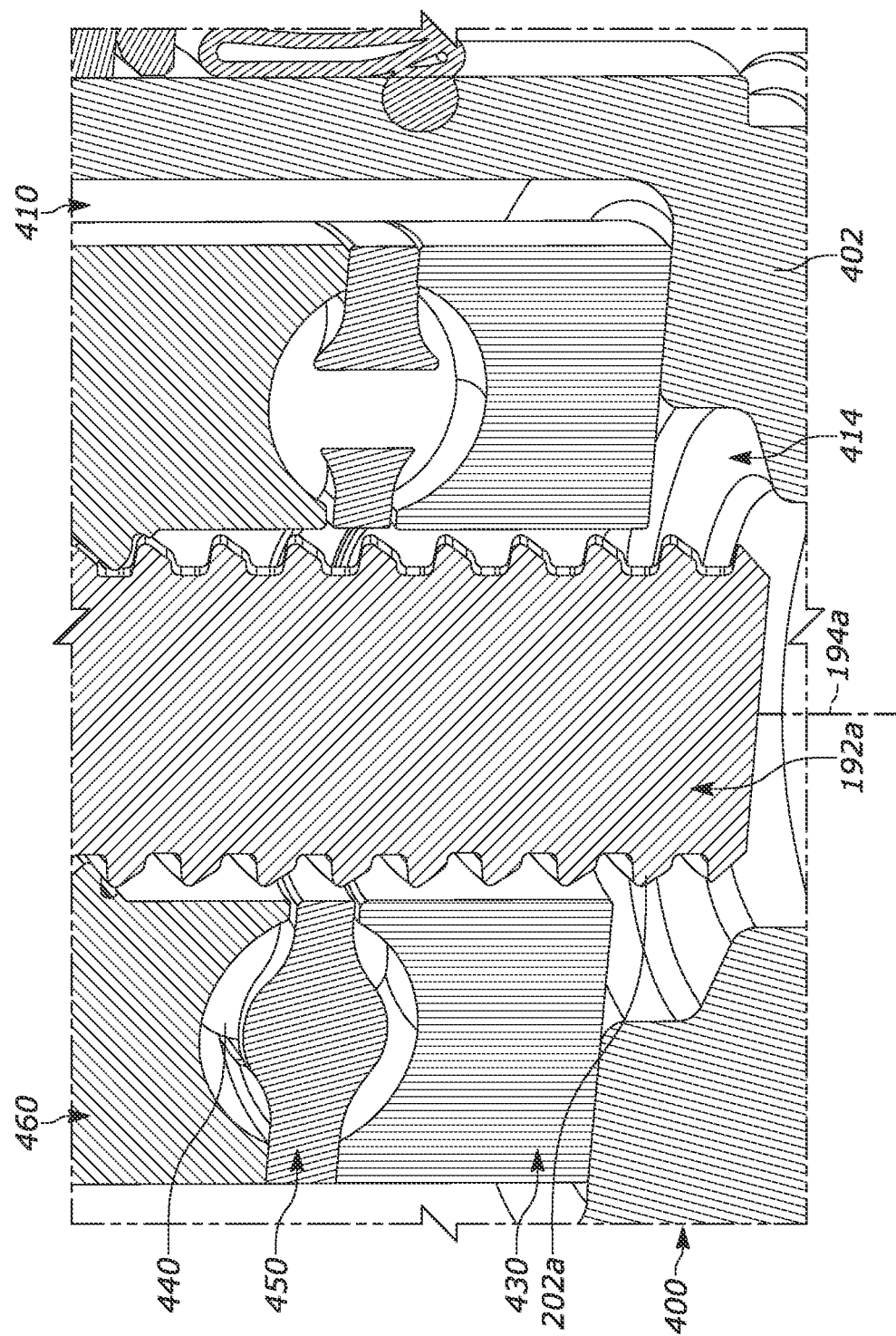
FIG. 25 is an enlarged view of another portion of FIG. 23B.

Additionally, and referring to FIG. 24, the base 462a of the ramp nut 460a includes a stepped recess adjacent the cage 476. The recess includes a first portion 463 for receiving the thrust bearing 478 and a second portion 465 for receiving a resilient member, such as a wireform 467. The wireform 467 is a contoured wire that can extend partially or entirely around the spindle 192a and engages the threads 202a thereof. In one example, the threads 202a of the spindle 192a adjacent the wireform 467 can include surfaces 201, 203 extending at multiple flank angles on the downward side, i.e., in a direction facing towards the second end 198a of the spindle.

Providing multiple downward flank angles is advantageous in that, since the flank surface 201 immediately adjacent the thread 202a root contacts the wireform 467, the wireform deflects when clamp force is generated such that the second flank surface 203 contacts the thread of the ramp nut 460a. That said, the wireform 467 acts to bias the spindle 192a in a direction towards the piston 402 and help to prevent axial movement of the piston 192a and, thus, axial movement of the piston connected thereto, during application of the parking brake.

The caliper assemblies 60, 390, 650 shown and described herein can be used in different configurations within the vehicle 20 depending on several factors, including the type of vehicle in which braking is desired. For example, and referring back to FIG. 1, current, motor-driven EPB systems (not shown) might be used solely with the rear wheels 32 or on at least one front wheel 30. In accordance with the present invention, any of the caliper assemblies 60, 390, 650 can be provided for all four wheels 30, 32 in the case of light duty vehicles. Alternatively, any of the caliper assemblies 60, 390, 650 can be provided on the front wheels 30 to supplement motor-driven EPB systems provided on the rear wheels 32 in the case of medium duty or heavy duty vehicles.

In the present example, the motor-less caliper assembly 60 is shown on all four wheels 30, 32. With this in mind, the braking system 10 of the present invention can rely on sensed vehicle conditions to determine when service brake and/or parking brake actuation is desired. To this end, the control system 44 continuously monitors signals received from the sensors 48, 50, 52, 54 and controls the service brake and/or parking brake accordingly. More specifically, the control system 44 can rely on a series of sequential steps illustrated in FIG. 26.

Figure 26:
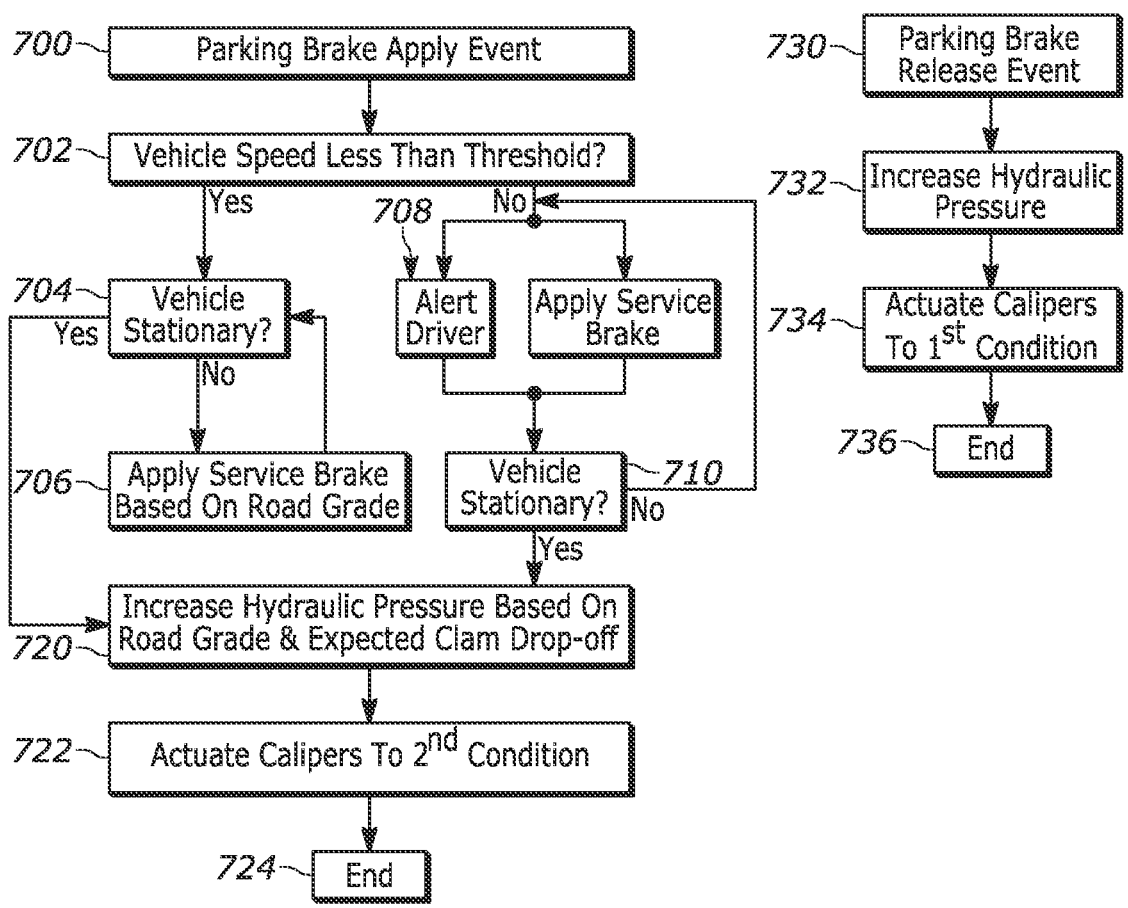
FIG. 26 is a flow chart for parking brake events when the vehicle is in a first condition.

In FIG. 26, the integrated brake control (IBC) system of the vehicle 20 is operational/available. The control system 44 continuously scans for parking brake related events. With this in mind, at step 700, the control system 44 determines that a parking brake apply event is detected. At step 702 the control system 44 checks whether the vehicle speed is below a predetermined threshold value, e.g., less than about 5 km/h. To this end, the control system 44 evaluates the signals received from the vehicle speed sensor 50.

If the vehicle speed is below the threshold value, at step 704, the control system 44 determines whether the vehicle 20 is stationary based on the vehicle speed sensor 50. If "no", at step 706 the control system 44 evaluates the signals from the road grade sensor 52 and applies the service brake accordingly until the control system 44 determines the vehicle 20 is stationary.

On the other hand, if the detected vehicle speed is not below the threshold value at step 702, at step 708 the control system 44 alerts the vehicle 20 driver, e.g., informs the driver via the alert 56 that services brakes will be applied, and automatically applies the service brake. In one example, the control system 44 applies hydraulic pressure to the caliper assemblies to decelerate the vehicle 20 at 0.3 g (or current OEM requirement) or, if the brake pedal is applied by the driver, at a deceleration corresponding to the brake pedal position from the sensor 48. In any case, the service brake is applied and the control system 44 checks whether the vehicle is stationary at step 710 until the inquiry is answered in the affirmative.

That said, once the vehicle 20 is stationary, at step 720 the control system 44 increases the hydraulic pressure at the caliper assemblies based on the both the road grade as well as the expected clamp drop-off. By "expected clamp drop-off", it is to be understood to mean the amount of clamping force expected to be lost in the transition between service braking and applying the parking brake. At step 722, the control system 44 actuates the clutch unit(s) to the second condition, thereby applying and maintaining the parking brakes. The program ends at step 724.

When a parking brake release event is detected at step 730, the control system 44 increases the hydraulic service brake pressure to, for example, 10% greater than the last-applied service brake hydraulic pressure. At step 734, the control system 44 actuates the clutch unit(s) to the first condition, thereby releasing the parking brakes. At step 736, the program ends. It will be appreciated that the parking brake release event could be, for example, sensing that the accelerator pedal is depressed greater than about 5% of its maximum stroke, i.e., a drive-away release (DAR).

Figure 27:
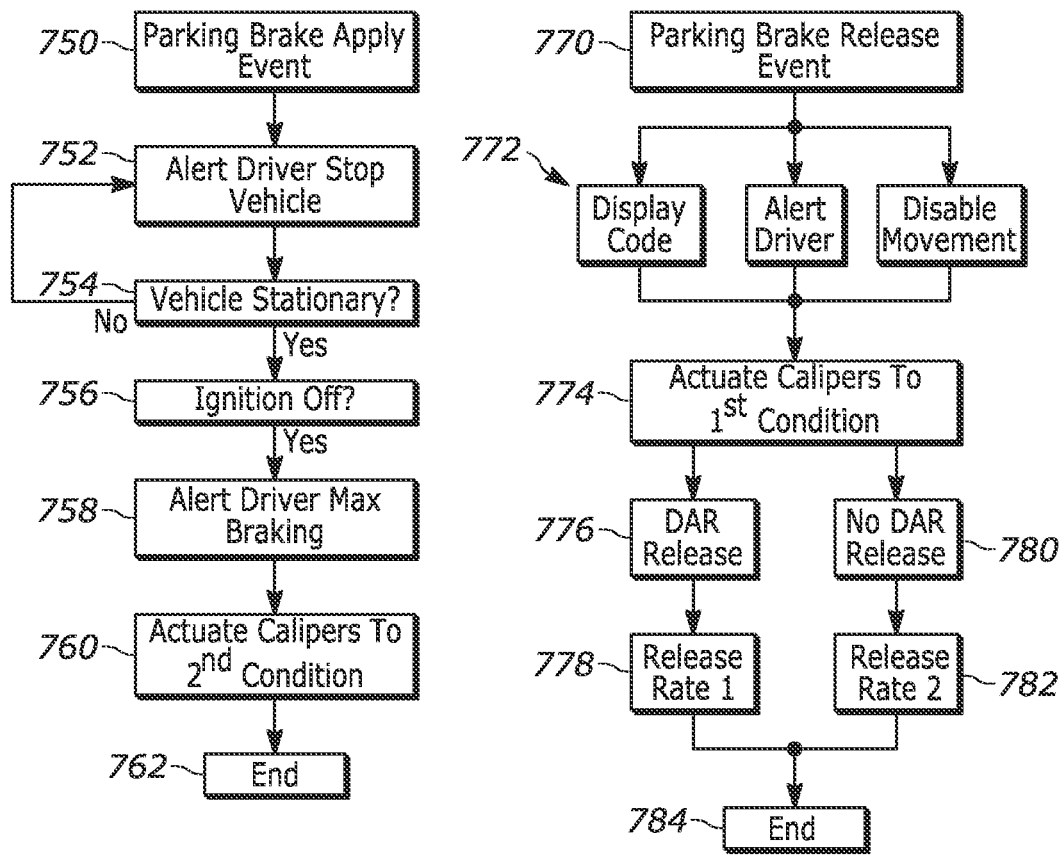
FIG. 27 is a flow chart for parking brake events when the vehicle is in a second condition.

In another example flow chart illustration in FIG. 27, the IBC system of the vehicle 20 is inoperable/unavailable. With this in mind, at step 750 the control system 44 detects a parking brake apply event. At step 752, the control system 44 alerts/instructs the operator of the vehicle 20 to apply the brake pedal until the determining the vehicle is stationary at step 754.

Once the vehicle 20 is stationary, at step 756 the control system 44 determines whether the ignition is off based on the ignition sensor 54. If "yes", at step 758 the control system 44 alerts/instructs the driver to apply a maximum brake pedal force. The driver maintains the maximum brake pedal force until a until the control system 44 actuates the clutch units to the second condition to apply the parking brakes at step 760. The program ends at step 762.

On the other hand, the control system 44 can detect a parking brake release event at step 770. When this occurs, the control system 44 displays a diagnostic trouble code (DTC) to the driver and/or alerts the driver that the IBC is not available. At the same time, the control system 44 disables vehicle movement entirely.

At step 774, the control system 44 actuates the clutch units to the first condition to release the parking brakes. If the parking brake release event is a DAR, the control system 44 releases the hydraulic pressure at step 778 at a first rate based on the accelerator pedal position and in a manner that helps to prevent vehicle rollback. If the parking brake release event is not a DAR, the control system 44 releases the hydraulic pressure at a second rate based on the brake pedal actuation. In both release events scenarios, the program ends at step 784.

The caliper assemblies of the present invention are advantageous for several reasons. First, utilizing a solenoid—as opposed to a traditional motor—to actuate the parking brake advantageously reduces the size of the clutch unit and allows the clutch unit to operate with reduced power. More specifically, the current/power draw for the bistable solenoid can be fulfilled with a small, on-board battery as opposed to relying on the vehicle battery. Using a motor-less clutch unit can also allow for the removal of other traditional caliper assembly components such as parking pawls.

Second, the clutch units described herein allow the caliper assemblies to maintain their clamping force, e.g., up to and exceeding about 90 kN, even when the hydraulic pressure is removed. This provides redundant braking control in the event of hydraulic system failure during parking brake application and/or a service brake mechanical push-through situation. Furthermore, the fast lead connection between the nut and spindle provides rapid clamping apply and release times, e.g., less than about 1.2 s in each direction, less than about 0.8 s in each direction, or less than about 0.3 s in each direction, with minimal resistive load on the piston and/or spindle. The fast lead also enables the solenoid or motor driving the clutch unit to operate with minimal current draw.

Additionally, the motor-less caliper assembly described herein can supplement the total vehicle parking capacity of motor-driven EPB systems. Consequently, the size of the motor-driven EPB systems can be advantageously reduced, with a reduced braking force requirement needed at each vehicle corner. Moreover, the motor-less caliper assemblies can be readily implemented in any hydraulic-based service braking system—including opposed piston constructions—with a simple connection at the inlet opening of the caliper housing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A parking brake for a wheel rotor having a brake pad associated therewith, comprising:
 a housing defining first and second passages;
 first and second pistons provided in the respective first and second passages;
 spindles threadably connected with each piston; and
 a clutch unit connected to the spindles, the clutch unit having a first condition allowing relative rotation between the spindles and the pistons such that the pistons are axially movable within the passages and into engagement with the brake pad in response to hydraulic pressure applied to the pistons, the clutch unit having a second condition preventing relative rotation between the spindles and the pistons such that pistons remains engaged with the brake pad when hydraulic fluid pressure is removed from the pistons,
 wherein for each spindle the clutch unit includes a hub rotatably connected to the spindle and roller bearings arranged around the hub, the roller bearings being spaced from the hub when the clutch unit is in the first condition to allow for rotation of the spindle, the roller bearings being urged against the hub when the clutch unit is in the second condition to prevent rotation of the spindle.

2. The parking brake of claim 1, further comprising a solenoid connected to the spindles and actuatable to place the clutch unit in the first condition or the second condition.

3. The parking brake of claim 2, wherein the solenoid is bistable.

4. The parking brake of claim 1, wherein the clutch unit is motor-less.

5. The parking brake of claim 1, wherein the pistons are independently axially movable relative to one another in response to hydraulic pressure applied thereto.

6. The parking brake of claim 5, wherein the first piston moves a first distance towards the brake pad and the second piston moves a second distance towards the brake pad different from the first distance to account for wear on the brake pad.

7. The parking brake of claim 1, wherein for each spindle the clutch unit further comprises:
 a roller cage including openings for receiving the roller bearings; and
 a wedge ring having an inner surface encircling the roller cage and including angled portions, wherein the roller bearings are positioned at a first location along the angled portions and spaced from the hub when the clutch unit is in the first condition and are positioned at a second location along the angled second portions and against the hub when the clutch unit is in the second condition.

8. The parking brake of claim 7, wherein the clutch unit includes an actuating arm connected to projections on the roller cages and a solenoid for actuating the actuating arm to rotate the roller cages and position the roller bearings in one of the first location and the second location.

9. The parking brake of claim 1, wherein the pistons are configured to provide a clamp force sufficient to park a vehicle once hydraulic pressure is removed.

10. A parking brake for a wheel rotor having a brake pad associated therewith, comprising:
 a housing defining a passage;
 a piston provided in passage;
 a spindle threadably connected with the piston; and
 a clutch unit connected to the spindle, the clutch unit having a first condition allowing relative rotation between the spindle and the piston such that the piston is axially movable within the passage and into engagement with the brake pad in response to hydraulic pressure applied to the piston, the clutch unit having a second condition preventing relative rotation between the spindle and the piston such that piston remains engaged with the brake pad when hydraulic fluid pressure is removed from the piston,
 wherein the clutch unit includes a hub rotatably connected to the spindle and roller bearings arranged around the hub, the roller bearings being spaced from the hub when the clutch unit is in the first condition to allow for rotation of the spindle, the roller bearings being urged against the hub when the clutch unit is in the second condition to prevent rotation of the spindle.

11. The parking brake of claim 10, wherein the hub comprises an adapter having a base rotatably connected with the spindle and a projection extending from the base and out of the housing.

* * * * *